US006567834B1

(12) United States Patent
Marshall et al.

(10) Patent No.: US 6,567,834 B1
(45) Date of Patent: May 20, 2003

(54) IMPLEMENTATION OF MULTIPLIERS IN PROGRAMMABLE ARRAYS

(75) Inventors: Alan David Marshall, Bristol (GB); Anthony Stansfield, Bristol (GB); Jean Vuillemin, Paris (FR)

(73) Assignee: Elixent Limited, Bristol (GB)

( * ) Notice: Subject to any disclaimer, the term of this patent is extended or adjusted under 35 U.S.C. 154(b) by 0 days.

(21) Appl. No.: 09/555,624
(22) PCT Filed: Dec. 16, 1998
(86) PCT No.: PCT/GB98/03786
§ 371 (c)(1),
(2), (4) Date: Jun. 1, 2000
(87) PCT Pub. No.: WO99/31574
PCT Pub. Date: Jun. 24, 1999

(30) Foreign Application Priority Data

Dec. 17, 1997 (EP) .............................................. 97310220
Jun. 9, 1998 (GB) .............................................. 9812362

(51) Int. Cl.[7] .............................................. G06F 7/52
(52) U.S. Cl. .................. 708/626; 708/627; 708/630
(58) Field of Search ............................... 708/626, 627, 708/630

(56) References Cited

U.S. PATENT DOCUMENTS

| 4,236,204 A | 11/1980 | Groves | |
|---|---|---|---|
| 4,698,751 A | 10/1987 | Parvin | 364/200 |
| 4,766,566 A | 8/1988 | Chuang | 712/23 |

(List continued on next page.)

FOREIGN PATENT DOCUMENTS

| EP | 0 726 532 | 8/1996 |
|---|---|---|
| WO | 95/22205 | 8/1995 |
| WO | 97/46948 | 12/1997 |

OTHER PUBLICATIONS

D. Bursky "Gate Arrays Face Onslaught of Dense and Flexible FPGA's", *Electronic Design*, vol. 43, No. 13, Jun. 26, 1995, pp. 85–86, 88, 90, 94, and 96.

(List continued on next page.)

Primary Examiner—David H. Malzahn
(74) Attorney, Agent, or Firm—Orrick, Herrington & Sutcliffe, LLP

(57) ABSTRACT

Implementation of multipliers in an FPGA or similar device containing an array or other aggregation of small processor devices is a significant difficulty, leading to increased cost as a result of the silicon area consumed thereby. There is thus provided a method of multiplying a first number by a second number by use of an array of processing devices, each of said processing devices having a plurality of data inputs, a plurality of data outputs, and an instruction input for control of the function of the processing device, wherein said processing devices and an input for the first number and an input for the second number are interconnected by a freely configurable interconnect, and wherein each processing device calculates a partial product for multiplication of one or more bits of the first number with one or more bits of the second number, and for each processing device: the value received at the instruction input is determined by one or more bits of the first number; data inputs are provided by m bits of the second number, and, if appropriate, a carry input to add a carry from a less significant partial product and/or a summation input to sum all the partial products of the same significance; data outputs are provided as a summation output containing the least significant m bits of the partial product and a carry output containing any more significant bits of the partial product.

28 Claims, 15 Drawing Sheets

U.S. PATENT DOCUMENTS

| | | | |
|---|---|---|---|
| 4,775,952 A | 10/1988 | Danielsson et al. | 364/736 |
| 5,204,556 A | 4/1993 | Shankar | |
| 5,208,491 A | 5/1993 | Ebeling et al. | |
| 5,233,539 A | 8/1993 | Agrawal et al. | |
| 5,291,431 A | 3/1994 | Ho et al. | 364/760 |
| 5,426,379 A | 6/1995 | Trimberger | |
| 5,457,644 A | 10/1995 | McCollum | 364/716 |
| 5,496,239 A | 3/1996 | Kallman et al. | |
| 5,498,975 A | 3/1996 | Cliff et al. | |
| 5,568,646 A | 10/1996 | Jaggar | |
| 5,583,450 A | 12/1996 | Trimberger et al. | |
| 5,586,277 A | 12/1996 | Brown et al. | 712/210 |
| 5,621,694 A | 4/1997 | Sakugawa et al. | 365/230.02 |
| 5,680,597 A | 10/1997 | Kumar et al. | 395/567 |
| 5,835,746 A | 11/1998 | Girardeau, Jr. et al. | 395/391 |
| 5,923,612 A | 7/1999 | Park et al. | 365/233 |
| 6,188,240 B1 | 2/2001 | Nakaya | 326/39 |

OTHER PUBLICATIONS

D. Bursky, "SRAM Blocks and Antifuse Logic Combine In New FPGA's", *Electronic Design*, vol. 43, No. 16, Aug. 7, 1995, pp. 115, 116, and 118.

G. Borriello, et al. "The Triptych FPGA Architecture", *IEEE Transactions On Very Large Scale Integration (VLSI) Systems*, vol. 3, No. 4, Dec., 1995, pp. 491–500.

Nagendra, et al. "Digit Pipelined Arithmetic On Fine–Grain Array Processors", *Journal of VLSI Signal Processing*, vol. 9, No. 3. Apr. 1, 1995, pp. 193–209.

Maxfield, C, "Logic That Mutates While–U–Wait", EDN (European Edition), Nov. 7, 1996, vol. 41, No. 23, pp. 137–140, 142.

Patent abstract of Japan, vol. 006, No. 104 (P–122), Jun. 15, 1982 (Abstract of Japanese Patent Document No. JP 57 036347 A (NEC Corp.), Feb. 27, 1982).

Patent abstract of Japan, vol. 007, No. 073 (P–186), Mar. 25, 1983 (Abstract of Japanese Patent Document No. JP 58 003040 A (NEC Corp.) , Jan. 8, 1983).

"The Thumb Architecture," Advanced RISC Machines Limited Specification, pp. 1–2, (1995).

Patterson, D.A., et al., *Computer Architecture: A Quantitative Approach*, San Mateo, California: Morgan Kaufmann Publishers, Inc., Chapter 4.5: pp. 160–166, Appendix E: pp. E–1–E24, (1995).

Chen, D.C., et al., "A Reconfigurable Multiprocessor IC for Rapid Prototyping of Real–Time Data Paths," IEEE International Solid–State Circuits Conference, pp. 74–75, (Feb. 1992).

Yeung, A.K., et al., "A Data–Driven Multiprocessor Architecture (PADDI2) for Irregular Computation–Intensive DSP Algorithms," IEEE VLSI Signal Processing Workshop, pp. 1–5 (Oct. 1992).

Mirsky, E., et al., "MATRIX: A Reconfigurable Computing Architecture with Configurable Instruction Distribution and Deployable Resources," FCCM '96: IEEE Symposium on FPGAs for Custom Computing Machines, Apr. 17–19, 1996, Napa, California, USA pp. 1–10.

DeHon, A., "Reconfigurable Architectures for General–Purpose Computing," Technical Report 1586, MIT Artificial Intelligence Laboratory, pp. 257–296.

Koren, I., "High–Speed Multiplication," *Computer Arithmetic Algorithms*, Englewood Cliffs, New Jersey: Prentice Hall, pp. 99–103, (1993).

Hartle, R.I., et al., "The serial–serial bit . . . ," *Digit–Serial Computation*, Norwell USA: Kluwer Academic Publishing, pp. 1–2, (1995).

Panneerselvam G et al.: "Design and Implementation of an Area and Time Efficient Systolic Parallel Booth Multiplier" Proceedings of the Midwest Symposium on Circuits and Systems, Detroit, Aug. 16–18, 1993, vol. 2, No. Symp. 36, Aug. 16, 1993, pp. 1497–1500, XP000499850 Institute of Electrical and Electronics Engineers see paragraph 3.

Balsara P. T. et al.: "Understanding VLSI Bit Serial Multipliers" IEEE Transactions on Education, vol. 39, No. 1, Feb. 1, 1996, pp. 19–28, XP000591050 see paragraph II–V.

Dadda L: "On Serial–Input Multipliers for Two's Complement Numbers" IEEE Transactions on Computers, vol. 38, No. 9, Sep. 1989, pp. 1341–1345, XP000053842 see paragraph III.

Satyanarayana et al: "A Comprehensive Approach etc . . . " Proc. 26th Southeastern Symp. on System Theory, 1994, pp. 229–233, XP002096708 see paragraph 3.

Wo et al.: "Exploiting Neural Network Parallelism" 1st Int. Workshop on Parallel Processing, 1994, pp. 586–592, XP002096709 Bangalore, India see paragraph 3.

IMPLEMENTATION OF MULTIPLIERS IN PROGRAMMABLE ARRAYS

The present invention relates to implementation of multipliers in programmable arrays, more particularly in a reconfigurable processor device.

A commercially successful form of reconfigurable device is the field-programmable gate array (FPGA). These devices consist of a collection of configurable processing elements embedded in a configurable interconnect network. Configuration memory is provided to describe the interconnect configuration—often SRAM is used. These devices have a very fine-grained structure: typically each processing element of an FPGA is a configurable gate. Rather than being concentrated in a central ALU, processing is thus distributed across the device and the silicon area of the device is used more effectively. An example of a commercially available FPGA series is the Xilinx 4000 series.

Such reconfigurable devices can in principle be used for any computing application for which a processor or an ASIC is used. However, a particularly suitable use for such devices is as a coprocessor to handle tasks which are computationally intensive, but which are not so common as to merit a purpose built ASIC. A reconfigurable coprocessor could thus be programmed at different times with different configurations, each adapted for execution of a different computationally intensive task, providing greater efficiency than for a general purpose processor alone without a huge increase in overall cost. In recent FPGA devices, scope is provided for dynamic reconfiguration, wherein partial or total reconfiguration can be provided during the execution of code so that time-multiplexing can be used to provide configurations optimised for different subtasks at different stages of execution of a piece of code.

FPGA devices are not especially suitable for certain kinds of computational tasks. As the individual computational elements are very small, the datapaths are extremely narrow and many of them are required, so a large number of operations are required in the configuration process. Although these structures are relatively efficient for tasks which operate on small data elements and are regular from cycle to cycle, they are less satisfactory for irregular tasks with large data elements. Such tasks are also often not well handled by a general purpose processor, yet may be of considerable importance (such as in, for example, image processing).

Alternative reconfigurable architectures have been proposed. One example is the PADDI architecture developed by the University of California at Berkeley, described in D. Chen and J. Rabaey, "A Reconfigurable Multiprocessor IC for Rapid Prototyping of Real Time Data Paths", ISSCC, February 1992 and A. Yeung and J. Rabaey, "A Data-Driven Architecture for Rapid Prototyping of High Throughput DSP Algorithms", IEEE VLSI Signal Processing Workshop, October 1992. Another alternative architecture is MATRIX, developed at the Massachussetts Institute of Technology and described in Ethan Mirsky and André deHon, "MATRIX: A Reconfigurable Computing Architecture with Configurable Instruction Distribution and Deployable Resources", FCCM '96—IEEE Symposium on FPGAs for Custom Computing Machines, Apr. 17–19, 1996, Napa, Calif., USA, and in more detail in André deHon, "Reconfigurable Architectures for General-Purpose Computing", pages 257 to 296, Technical Report 1586, MIT Artificial Intelligence Laboratory. The MATRIX structure has advantageous aspects, but the coarse grain size means that it consumes more silicon than a conventional FPGA structure and is likely to be less efficient for tasks which are regular from cycle to cycle. It would therefore be desirable to develop further reconfigurable structures which combine as best possible the advantages of both MATRIX and of conventional FPGAs.

A further development of the present applicants, described in European Patent Application No. 97310220.5, filed on Dec. 17, 1997 (with an overall architecture termed "CHESS", and described in International Patent Application No. GB 98/00248, filed on Jan. 28, 1997) describes a reconfigurable device comprising: a plurality of processing devices; a connection matrix providing an interconnect between the processing devices; and means to define the configuration of the connection matrix; wherein each of the processing devices comprises an arithmetic logic unit adapted to perform a function on input operands and produce an output, wherein said input operands are provided as inputs to the arithmetic logic unit from the interconnect on the same route in each cycle, and wherein means are provided to route the output of a first one of the processing devices to a second one of the processing devices to determine the function performed by the second one of the processing devices.

In a preferred form of CHESS, each of the processing devices has a first operand input, a second operand input, a function result output, a carry input and a carry output, wherein the first operand input, the second operand input and the function result output are n-bit, where n is an integer greater than 1, and the carry input and the carry output are 1-bit. A particularly good design solution is found when n is equal to 4. The mechanism used for dynamic instruction is that each of the processing devices is adapted to receive, for determination of its function, an n-bit instruction input from another of the processing devices.

It is also advantageous that each of the processing devices contains a latchable output register for the function output. This is useful for constructing a "deep" pipeline, where for example it is necessary to perform a number of operations in parallel and synchronise the provision of output from different ALUs.

A particularly important issue for all of the architectures described above is the implementation of a multiplier. Multipliers are a key element for many calculations, and many of the applications most suitable for use in an ASIC or coprocessor will contain large number of multiplication operations. A conventional approach to implementation of a multiplier is now described.

A combinational multiplier is commonly built as a repetitive array of core cells, in which each cell multiplies some bits (say M bits) from the multiplicand A with some bits (say N bits) from the multiplier B, to produce an (M+N) bit partial product. To allow a complete multiplier to be built, each core cell also needs to be able to add two additional inputs to the partial product, i.e. to compute the function ((A*B)+C+D). The D input is used to sum all of the partial products of the same significance, and the C input is used to add carries from less significant partial products. The (M+N) bit result from each core cell is divided into two portions:

1. The least significant M bits are fed to the D input of the adjacent core cell that produces a result of the same arithmetic significance.
2. The most significant N bits are fed to the C input of the adjacent core cell that produces a result M bits more significant.

The core cell of a 1 bit*1 bit multiplier can be implemented in one of three ways:

1. As two of 4-input lookup tables (LUTs), each with A, B, C, D as inputs, and each producing one of the two bits of output.

2. As a two input AND gate to compute (A*B), feeding a full adder that adds the result to C and D. This requires one 2-input LUT and two 3-input LUTs.
3. As a full adder to compute (A+C+D), feeding a multiplexer that selects either this result or D to be fed to the output, under the control of B.

Either of these solutions costs more resources than would be needed simply to perform the full addition. Multipliers are hence costly (in terms of silicon area, and hence in terms of actual cost) in FPGA structures. Any approach in devices of this general type which can increase the density of multipliers in a processing array will be highly advantageous in reducing cost.

Accordingly, the invention provides a method of multiplying a first number by a second number by use of an array of processing devices, each of said processing devices having a plurality of data inputs, a plurality of data outputs, and an instruction input for control of the function of the processing device, wherein said processing devices and an input for the first number and an input for the second number are interconnected by a freely configurable interconnect, and wherein each processing device calculates a partial product for multiplication of one or more bits of the first number with one or more bits of the second number, and for each processing device: the value received at the instruction input is determined by one or more bits of the first number; data inputs are provided by m bits of the second number, a summation input to sum all the partial products of the same significance, and, if appropriate, a carry input to add a carry from a less significant partial product; and data outputs are provided as a summation output containing the least significant m bits of the partial product and a carry output containing any more significant bits of the partial product.

The present invention relates to devices and architectures which include a freely connectable interconnect, where it is generally possible (except possibly for certain special cases) for any input and output to be connected to each other. The commonest form of architecture of this general type is a Field Programmable Gate Array (FPGA). Architectures in which certain limited choices of connection between inputs and outputs, or certain inputs and outputs, are available are not considered here to fall within the scope of the term "freely connectable".

It has been appreciated by the present inventors that for the conventional multiplier design, the required result from each core cell is either (A+C+D) or D, dependent on the value of B. (If B is zero, then (A*B) is zero, and also C becomes zero because B is also zero in the core cell that produces C). In other words a full adder would be sufficient to compute the required result, if its functionality could be controlled according to the value of B. In a conventional FPGA, the function of each logic unit is fixed at configuration time, and such data-dependent control of functionality is not possible. With the structure indicated above, such control is possible, and a dense multiplier is achieved.

Specific embodiments of the invention are described below, by way of example, with reference to the accompanying drawings, in which.

Embodiments of the invention will be described in the context of the CHESS architecture, described in International Patent Application No. GB 98/00248, filed on Jan. 28, 1997, and in European Patent Application No. 97310220.5, filed on Dec. 17, 1997, the contents of which applications are incorporated by reference herein. A brief description of relevant aspects of the architecture, and of the mechanisms used for passing instructions to processing elements, is provided. The conventional approach to construction of a combinational multiplier is then described, together with the application of this conventional approach to a CHESS-like array. Embodiments employing the first and second aspects of the invention in a CHESS-like array are described thereafter.

In the following description, the terms "horizontal", "vertical", "North", "South", "East" and "West" have been used to assist in an understanding of relative directions, but their use is not intended to imply any restriction on the absolute orientation of the embodiment of the invention.

The processor array for the embodiment of the invention is provided in an integrated circuit. At one level, the processor array is formed by a rectangular (and preferably square) array of "tiles" 10, one of which is shown bounded by a thick line in FIG. 1. Any appropriate number of tiles may be employed, for example in a 16×16, 32×32 or 64×64 array. Each tile 10 is rectangular and is divided into four circuit areas. It is preferable for these tiles to be logically square (to provide symmetry in connection), although it is of less significance that they be physically square (this may have some advantage in providing symmetry in timing, but this will generally be less likely to be of significance). Two of the circuit areas 12, which are diagonally opposed in the tile 10, provide the locations for two arithmetic logic units ("ALUs"). The other two circuit areas, which are diagonally opposed in the tile 10, provide the locations for a pair of switching sections 14.

Figure 1:
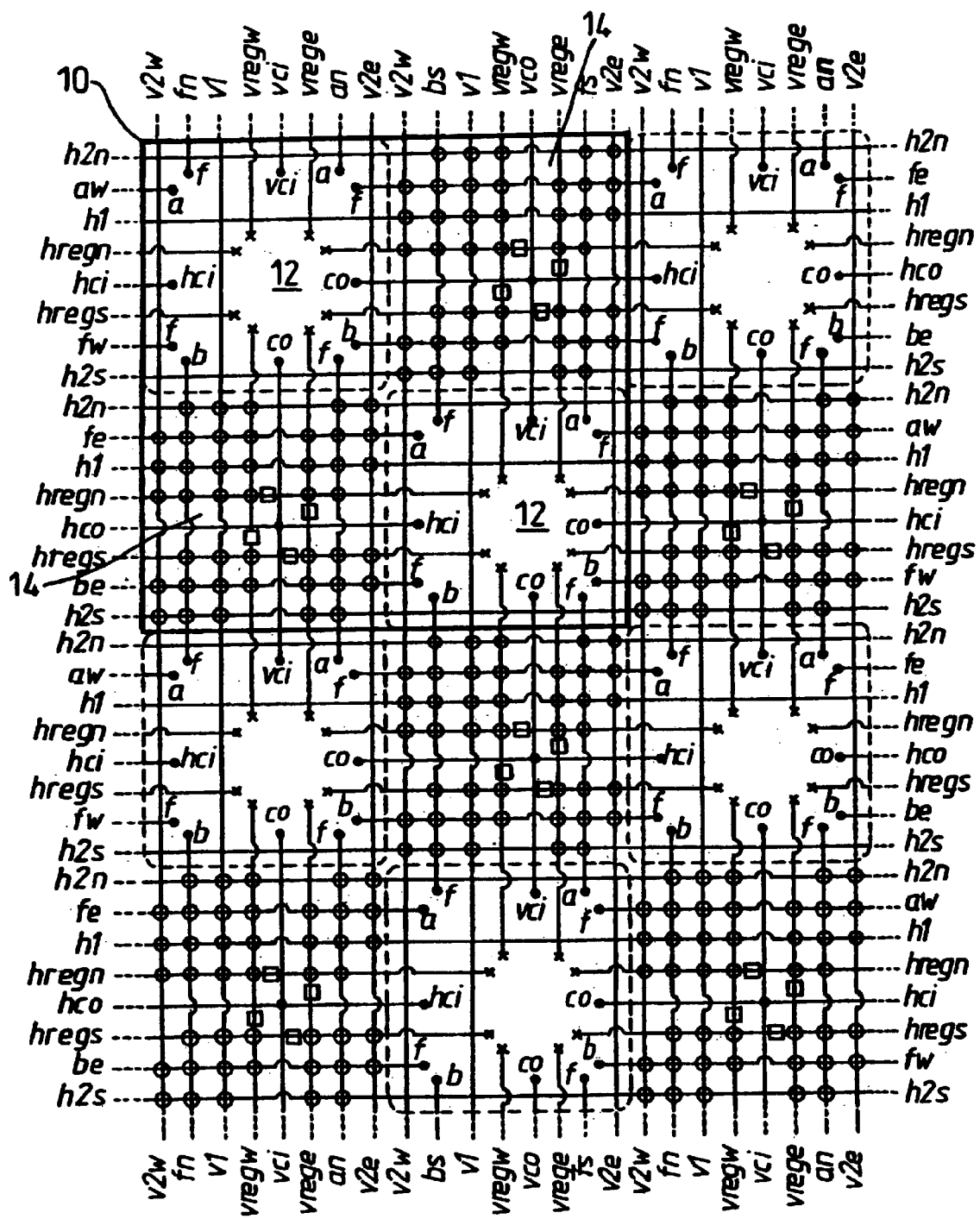
FIG. 1 shows part of a processor array in which embodiments of the invention may be employed, illustrating six switching sections and the locations of six arithmetic logic units.
Figure 2:
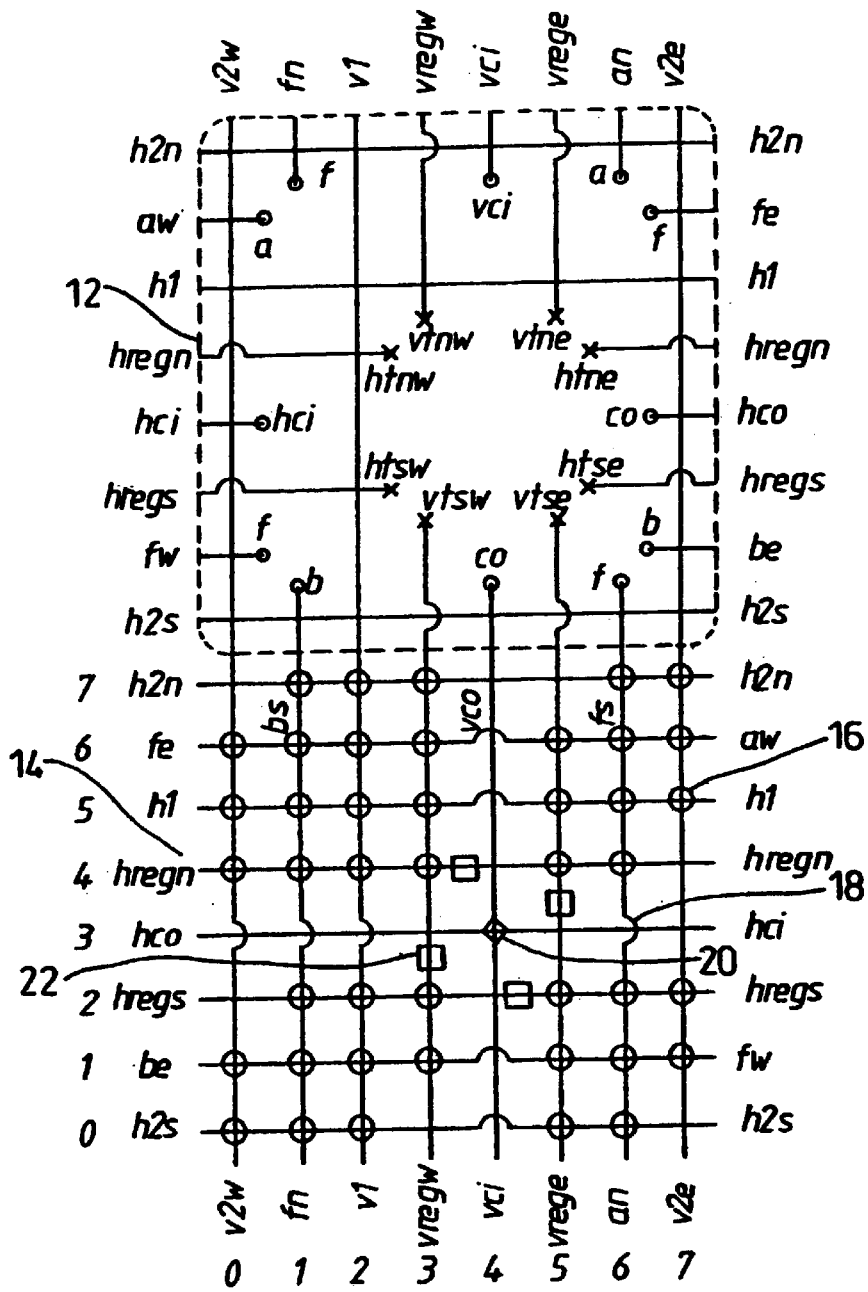
FIG. 2 is a diagram of part of the arrangement shown in FIG. 1 on a larger scale, illustrating one of the switching sections and one of the locations of the arithmetic logic units.

Referring to FIGS. 1 and 2, each ALU has a first pair of 4-bit inputs a, which are directly connected within the ALU, a second pair of 4-bit inputs b, which are also directly connected within the ALU, and four 4-bit outputs f, which are directly connected within the ALU. Each ALU also has an independent pair of 1-bit carry inputs hci, vci, and a pair of 1-bit carry outputs co, which are directly connected within the ALU. The ALU can perform standard operations on the input signals a, b, hci, vci to produce the output signals f, co, such as add, subtract, AND, NAND, OR, NOR, XOR, NXOR and multiplexing and optionally can register the result of the operation. The operation of an individual ALU is discussed in greater detail below. The instructions to the ALUs may be provided from respective 4-bit memory cells whose values can be set externally, or may be provided on a bus system.

At the level shown in FIGS. 1 and 2, each switching section 14 has eight busses extending across it horizontally, and eight busses extending across it vertically, thus forming an 8×8 rectangular array of 64 crossing points, which have been numbered in FIG. 2 with Cartesian co-ordinates. All of the busses have a width of four bits, with the exception of the carry bus vc at X=4 and the carry bus hc at Y=3, which have a width of one bit. At many of the crossing points, a 4-gang programmable switch 16 is provided which can selectively connect the two busses at that crossing point. At some of the crossing points, a 4-gang programmable switch 18 is provided which can selectively connect two busses which meet end to end at that crossing point, without any connection to the bus at right angles thereto. At the crossing point at (4, 3), a programmable switch 20 is provided which can selectively connect the carry busses vc, hc which cross at right angles at that point.

As shown in FIG. 2, the busses bs, vco, fs are connected to input b, output co and output f, respectively, of the ALU to the North of the switching section 14. Also, the busses fe, hco, be are connected to the output f, output co and input b of the ALU, respectively, to the West of the switching section 14. Furthermore, the busses aw, hci, fw are connected to the input a, input ci and output f, respectively, of the ALU to the East of the switching section 14. Moreover, the busses fn, vci, an are connected to the output f, input ci and input a, respectively, of the ALU to the south of the switching section 14.

In addition to these connections, the busses vregw, vrege are connected via respective programmable switches 18 to 4-bit connection points vtsw, vtse, respectively, (shown by crosses in FIG. 2) in the area 12 of the ALU to the North of the switching section 14. Also, the busses hregs, hregn are connected via respective programmable switches 18 to 4-bit connection points htse, htne, respectively, in the area 12 of the ALU to the West of the switching section 14. Furthermore, the busses hregs, hregn are connected via respective programmable switches 18 to 4-bit connection points htsw, htnw, respectively, in the area 12 of the ALU to the East of the switching section 14. Moreover, the busses vregw, vrege are connected via respective programmable switches 18 to 4-bit connection points vtnw, vtne, respectively, in the area 12 of the ALU to the south of the switching section 14.

Also, as shown in FIG. 2, the busses hregn, vrege, hregs, vregw have respective 4-bit connection points 22 (shown by small squares in FIG. 2) which will be described below in further detail with reference to FIG. 3.

As mentioned above with reference to FIGS. 1 and 2, at each switching section 14, the busses hregn, hregs, vregw, vrege are connected by respective 4-bit connections 22 to a register or buffer circuit, and this circuit will now be described in more detail with reference to FIG. 3. The four connections 22 are each connected to respective inputs of a multiplexer 26. The multiplexer 26 selects one of the inputs as an output, which is supplied to a register or buffer 28. The output of the register or buffer 28 is supplied to four tri-state buffers 30s, 30w, 30n, 30e, which are connected back to the connections 22 to the busses hregs, vregw, hregn, vrege, respectively. In the case where a buffer 28 is used, the 4-bit signal on a selected one of the busses hregs, vregw, hregn, vrege is amplified and supplied to another selected one of the busses hregs, vregw, hregn, vrege. In the case where a register 28 is used, the 4-bit signal on a selected one of the busses hregs, vregw, hregn, vrege is amplified and supplied to any selected one of the busses hregs, vregw, hregn, vrege after the next active clock edge.

Figure 3:
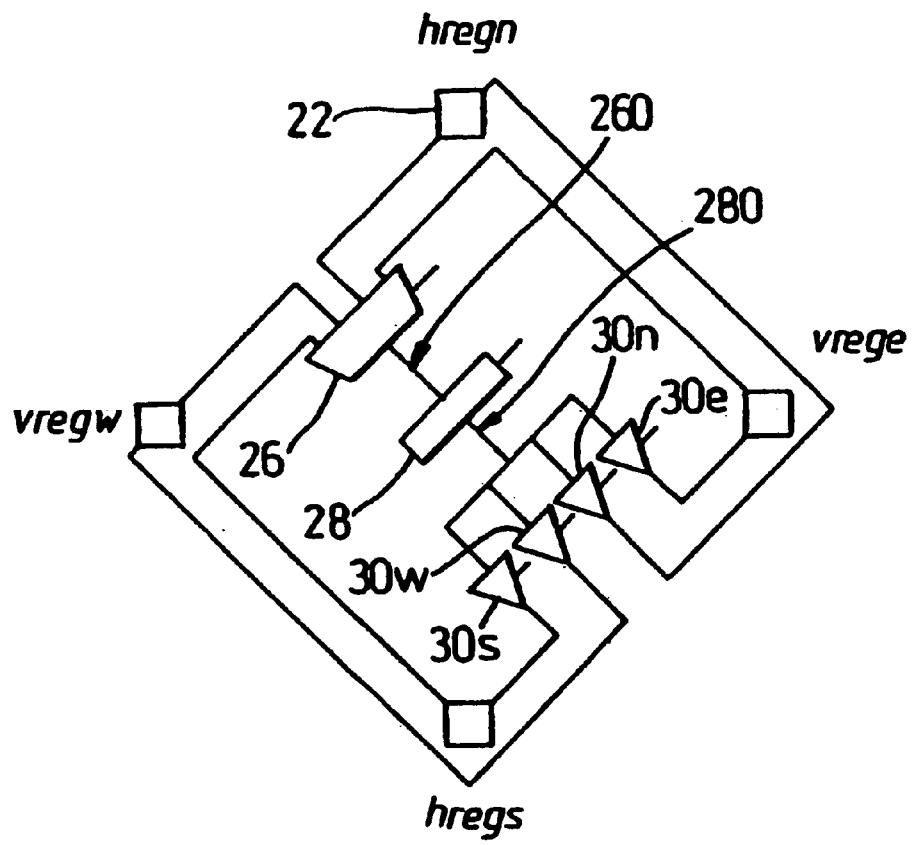
FIG. 3 shows a buffer and register which may be used in each switching section.

Use of an enhanced form of this FIG. 3 structure renders it possible to extract a 4-bit signal on a selected one of the busses hregs, vregw, hregn and vrege for a different purpose from interbus routing. Appropriate construction and connection of multiplexer 26 (or in alternative arrangements, of buffer 28) allows selection of a value received from the wiring network as the output of the multiplexer 26 or buffer 28 (these choices being indicated as 260 and 280 respectively on FIG. 3), with that value then being used in determining the instruction of the ALU associated with that switchbox. The applications of this arrangement are discussed further below.

Use of the multiplexer 26 or buffer 28 for this purpose means that the value used for providing instruction to the ALU is also the value made available for passing onwards through the wiring network. A different switching section 14 has to be used if it is desired to pass a different value between wires. However, in many arrangements it will be desirable for the value passed to the ALU to determine its instruction also to be the value passed from one wire to another: this is appropriate where it is desired to provide the same instruction to a number of ALUs, which may occur often in a deep processing pipeline. An alternative embodiment, not shown, employs two or more pairs of multiplexers 26 and buffers 28: in this case, one multiplexer/buffer pair can be dedicated to provision of the instruction input for the associated ALU, whereas the other pair or pairs can be used for routing.

It should be noted that although particular bit widths, sizes of switching section and sizes of array have been mentioned, but it should be noted that all of these values may be changed as appropriate. Also, the programmable switches 16, 18, 20 have been described as being disposed at particular locations in each switching section 14, but other locations may be used as required and desired. The principles of the CHESS architecture are also applicable to three-dimensional arrays, for example by providing a stack of the arrays described above, with the switching sections in adjacent layers staggered with respect to each other. The stack might include just two layers, but preferably at least three layers, and the number of layers is preferably a power of two.

Figure 4A:
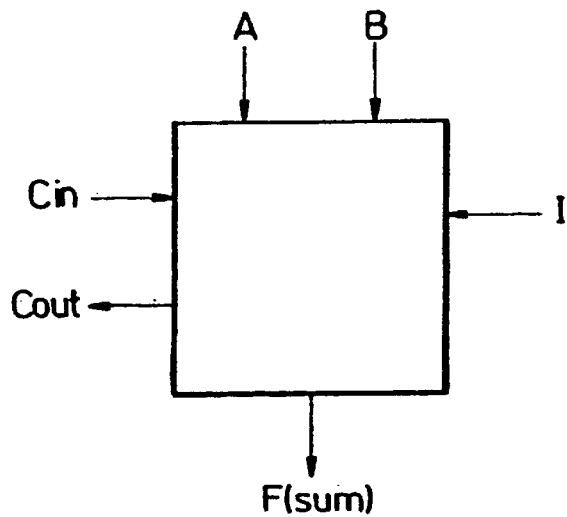
FIG. 4a shows a block diagram illustrating an individual arithmetic logic unit for use in the array of FIG. 1.

The structure of the ALU used in this embodiment of the invention will now be described with reference to FIG. 4a and FIG. 4b. As is shown in FIG. 4a, the ALU has four inputs, A, B, I, and $C_{in}$, and two outputs, F and $C_{out}$. A, B, I and F are all four bits wide and are connected to the general interconnect by the neighbouring switch blocks, as is described above for A, B and F. The input for I is extracted from multiplexer 26 shown in FIG. 3. $C_{in}$ and $C_{out}$ are both 1 bit wide, and are connected to a more restricted interconnect, also as described above. A and B provide the operands for the ALU, and F the output. $C_{in}$ and $C_{out}$ provide the carry function, but also have significance in control. I provides an instruction input which determines the functional operation of the ALU: this is in contrast to a standard FPGA, in which functional units are controlled by a set of memory bits. The significance of this feature, and the mechanisms provided for routing instruction inputs from the wiring network to the ALU, are discussed further below.

The ALU has four principal components:
- the ALU datapath, which consists of four identical bitslices;
- the instruction decoder;
- the carry/control input conditioning logic; and
- the switch block programming interface (in other embodiments of the invention, this need not be present in the ALU itself, however, the presence of this feature within the ALU allows the possibility of using the ALU in a look-up table mode).

Figure 4B:
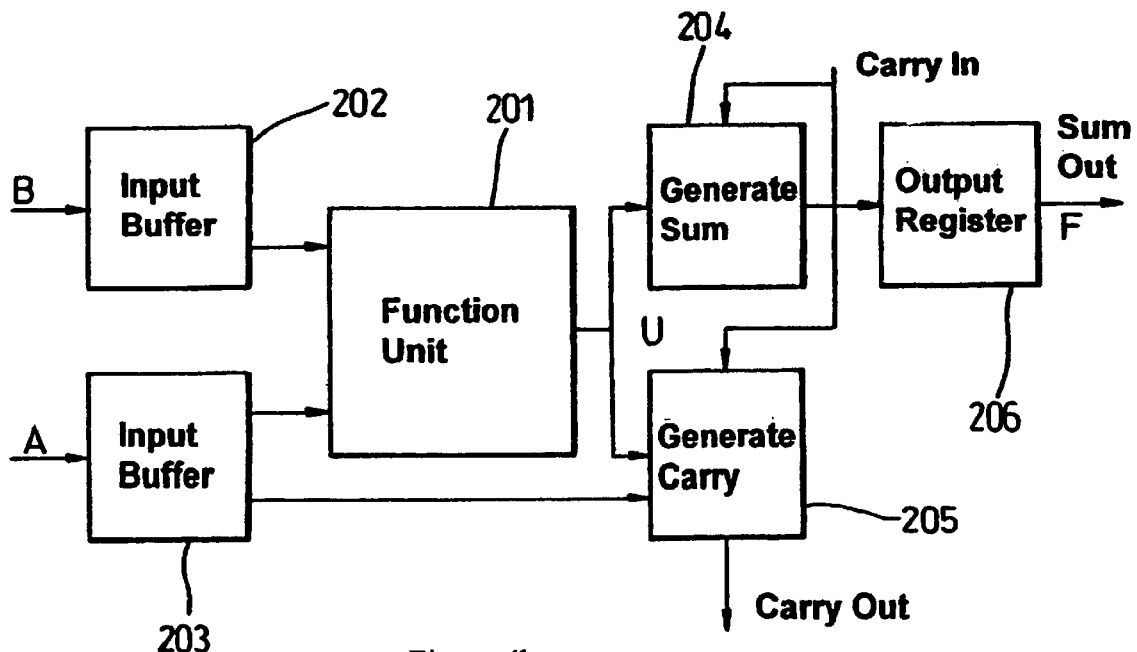
FIG. 4b shows schematically a bitslice of this individual arithmetic logic unit.

FIG. 4b shows a block diagram of a single bitslice of the ALU.

The two "input buffers" 202 and 203 are no more than a means of providing electrical connection to the routing network. There is no addressable input register (and hence register file) in this architecture: the operands are provided to the function unit 201 of the ALU from the same place (the wiring network) in each cycle.

Function unit 201 operates as a lookup table (LUT) which generates a boolean function, U, of the two inputs A and B. The precise function is set by four control signals ($L_3$, $L_2$, $L_1$, $L_0$) and generates the Karnaugh map shown in Table 1:

TABLE 1

Karnaugh map for ALU bitslice
U =

|   | A | |
|---|---|---|
| B | 0 | 1 |
| 0 | $L_0$ | $L_1$ |
| 1 | $L_2$ | $L_3$ |

The generation of the control signals $L_i$ is discussed further below.

Generate sum 204 provides a sum output derived by an XOR of U and $C_{in}$:

Sum=U XOR $C_{in}$ $C_{out}$ is generated by generate carry 205 according to the following Boolean equations:

P=U OR $L_4$

G=A OR $L_5$ $C_{out}$=IF P THEN $C_{in}$ ELSE G where P can be considered as a propagate function and G as a generate function. The signals $L_i$ are again generated in a manner discussed further below.

The output register 206 optionally latches the sum output, this option being selectable under the control of the ALU programming memory. Optionally, a similar latching arrangement can be provided for the carry output. These features are advantageous for use in deep pipelines where the same operation may need to be performed synchronously or in time-controlled manner in several ALUs.

A wide variety of different possible bitslices can be employed. The choice of bitslice type selected in a given architecture may be a function of the type of instruction that the architecture as a whole is intended to process most efficiently. It is clearly desirable to enable the use of a variety of functions which can act as useful building blocks for more complex operations. Other features are also desirable. One desirable feature is the capacity to "divert" some bits from their normal function to allow control over other circuit elements. Another desirable feature is the capacity to store a fixed instruction for any ALUs which do not in a particular configuration require dynamic instruction switching. It is also desirable for there to be a suitable default state to allow for the ALU to be used as a read/write port for the switchbox (or look-up table). No specific bitslice will be described for these applications: an example of an appropriate bitslice is shown in European Patent Application No. 97310220.5. For the purposes of the present invention, all that is necessary is that the ALU is able to support the functions indicated in the different multiplier implementations described below.

The provenance of the instruction bits for the ALU will however be discussed. An element of the CHESS architecture here described is the ability to generate an instruction for a functional unit as the output of another functional unit.

Input signals containing dynamic instructions I (4-bit instructions generated by another ALU in the array, or optionally obtained from a memory accessable to the wiring network) are received from connections to the wiring network: these can be obtained through multiplexer 26 (see FIG. 3) as indicated above. If it is desired that there be multiple choices available, this can be achieved by using one or more additional ALUs in multiplexer configurations.

The 4-bit output of an ALU can thus be used as a dynamic instruction input I for another ALU. The carry output of an ALU can also be used as the carry input for another ALU, and this can be exploited in the provision of dynamic instructions. There are three basic ways in which the operation of an ALU can be varied dynamically:

1. $C_{in}$ can be used to multiplex between two versions of a function, with the instruction bits I remaining constant.
2. The instruction bits I can be changed while $C_{in}$ remains the same.
3. Both the instruction and the value of $C_{in}$ can be changed.

The application of this dynamic instruction provision feature to implementation of multipliers is discussed further below.

As indicated above, a conventional combinational multiplier is commonly built as a repetitive array of core cells, in which each cell multiplies some bits (say M bits) from the multiplicand A with some bits (say N bits) from the multiplier B, to produce an (M+N) bit partial product. Each core cell also needs to be able to compute the function ((A*B)+C+D), where the D input is used to sum all of the partial products of the same significance, and the C input is used to add carries from less significant partial products. The (M+N) bit result from each core cell is divided into two portions: least significant M bits are fed to the D input of the adjacent core cell that produces a result of the same arithmetic significance; and the most significant N bits are fed to the C input of the adjacent core cell that produces a result M bits more significant. As previously indicated, the required result from each core cell is either (A+C+D) or D, dependent on the value of B.

Figure 5A:
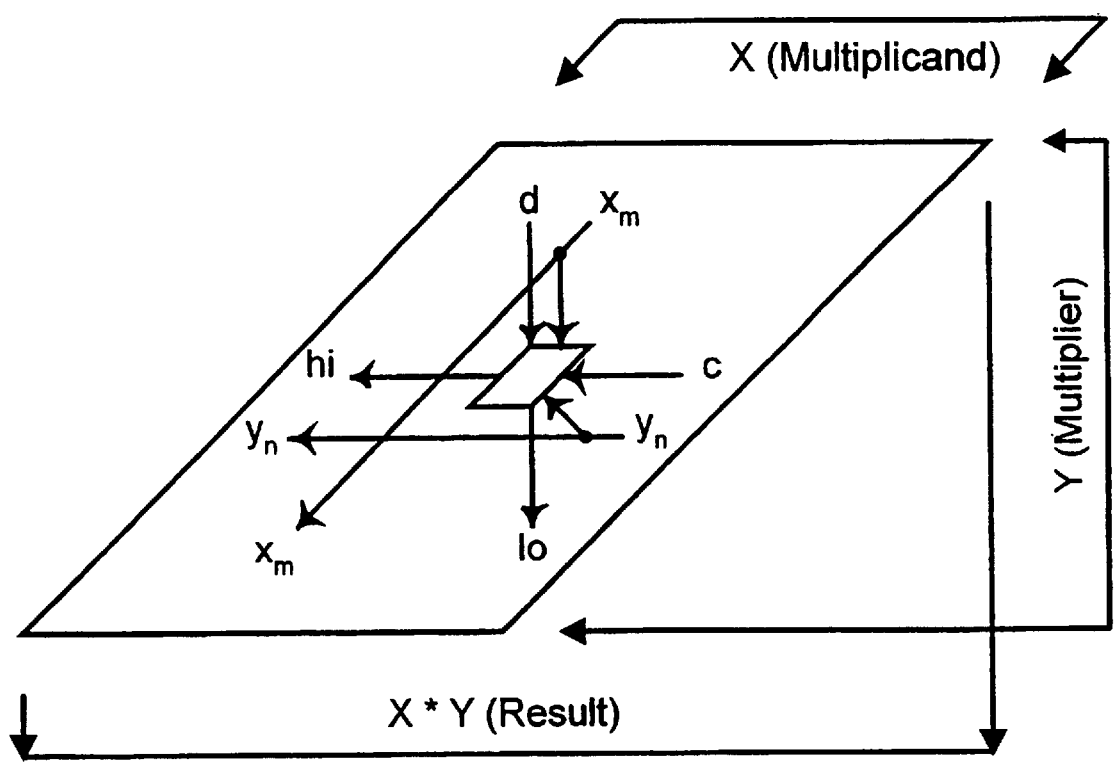
FIGS. 5a and 5b show the basic structure of a combinational multiplier.

The basic structure of a multiplier, laid out as in a longhand multiplication, is shown in FIG. 5a. The multiplicand X is split into multiple sets of bits $x_m$, and the multiplier Y is split into multiple sets of bits $y_n$. The multiplier is made up of an array of basic cells, each of which computes $((x_m * y_n) + c + d)$ for some m and n. The result is split into two parts, lo and hi, which are the less and more significant portions of the result respectively. The lo result is fed to the d input of the basic cell below, and the hi result (which has greater arithmetic significance) is fed to the c input of the basic cell to the left.

Figure 5B:
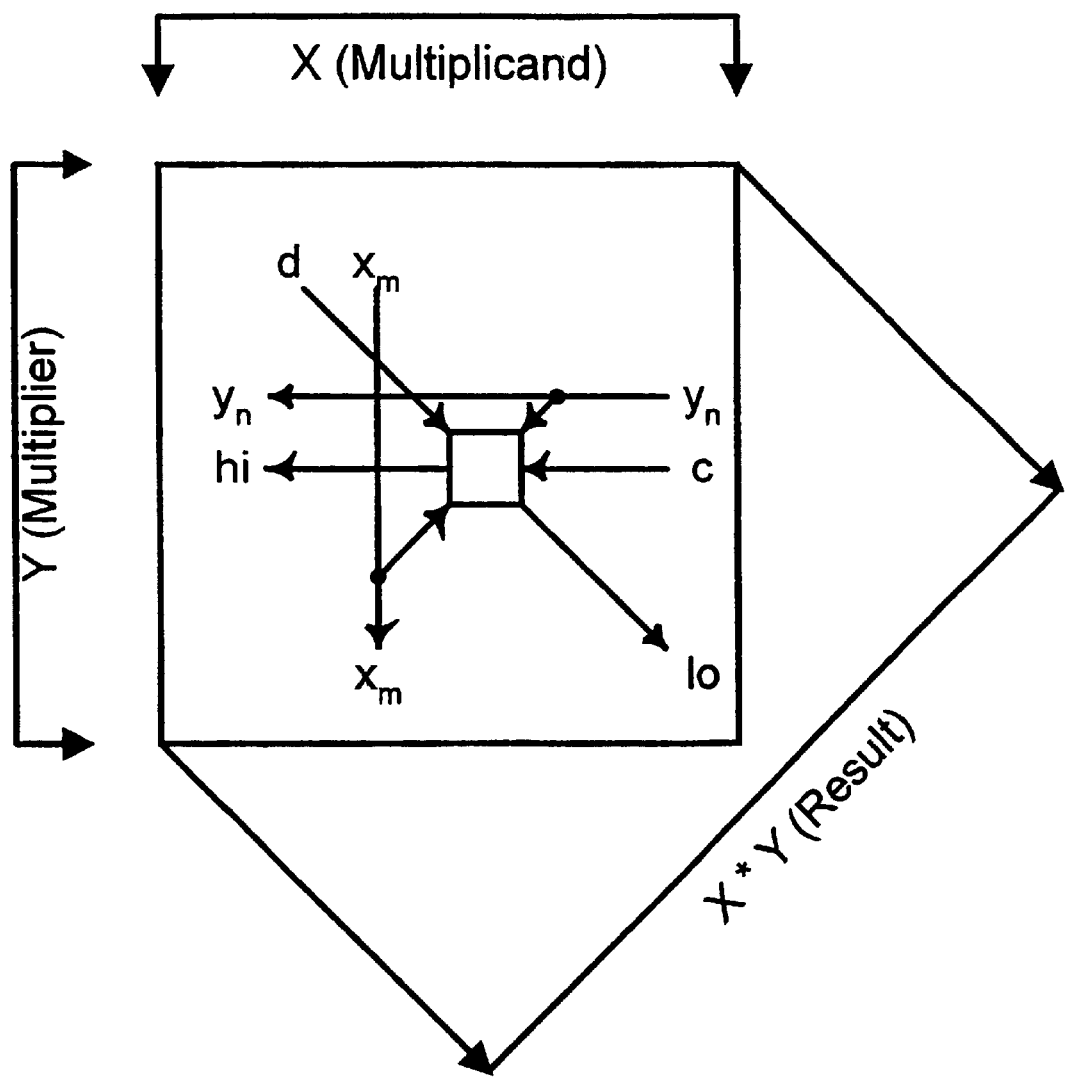

The same multiplier structure is shown, skewed through 45 degrees, in FIG. 5b. The skewed arrangement of FIG. 5b shows how the multiplier fits on a rectangular array, with the multiplier Y being fed from the left. This layout is appropriate for an efficient physical implementation.

Alternative methods of implementing such conventional approaches in a field programmable array, which may be of the CHESS type or a conventional FPGA, will now be described.

Figure 6A:
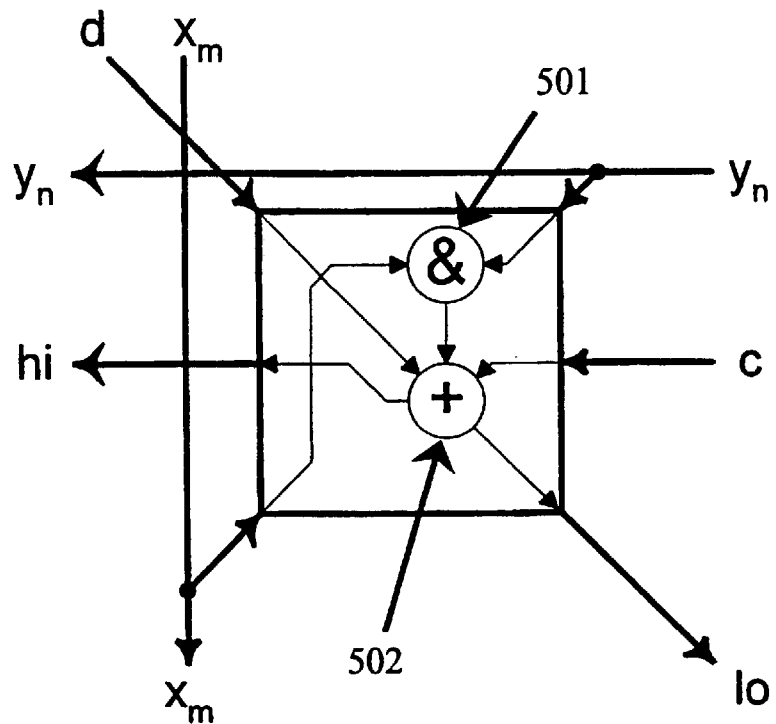
FIGS. 6a and 6b show conventional approaches to the implementation of a multiplier in a processing element of a processing array.
Figure 6B:
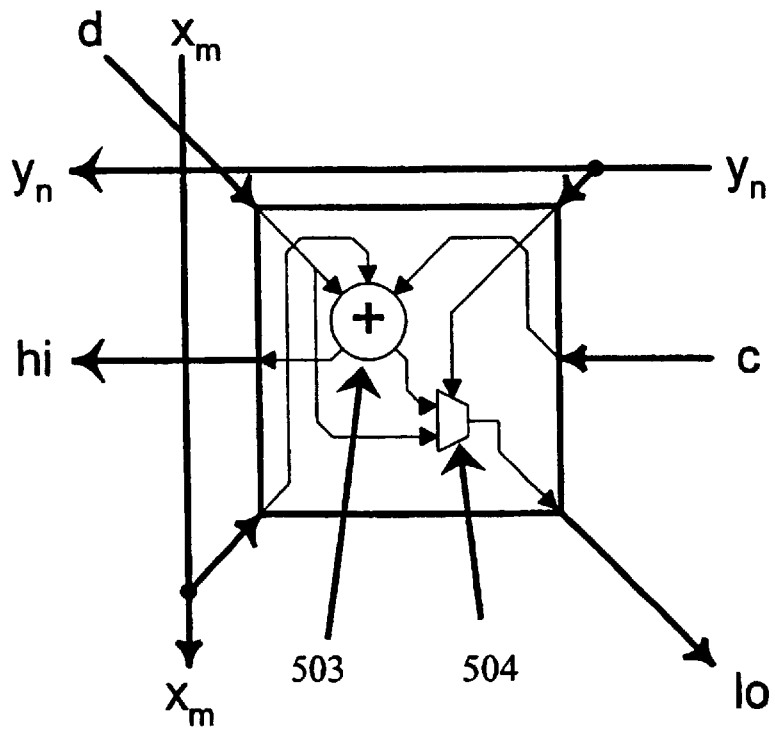

FIG. 6a shows one implementation of a basic multiplier cell in a CHESS like structure applying the conventional approach to multiplier construction. The multiplication of bits $x_m$ and $y_n$ is performed by an AND gate 501. A full adder 502 sums the result of this partial multiplication with the inputs c and d, to produce the local lo and hi results. An alternative implementation is shown in FIG. 6b. Here, the addition is always performed by the adder 503 as if the multiplier bit $y_n$ was 1. If $y_n$ was 0, then the multiplexer 504 is used to force the lo result to the value of the incoming d signal, which is the correct result in that case. It should be noted that although there should not be any carry C for the $y_n$ is 0 case, a processing element may propagate a spurious carry at the hi output. However, because $y_n$ is 0 for the processing element which will receive the carry (the next stage in significance for the same multiplier bit), this signal will have no effect on the overall result.

Both of the multiplier cells shown in FIGS. 6a and 6b cost somewhat more to implement than does the adder alone. Typically in a field programmable array, the adder will cost one processing cell, whereas the AND gate (of FIG. 6a) or the multiplexer (of FIG. 6b) would cost a further processing cell.

Figure 7:
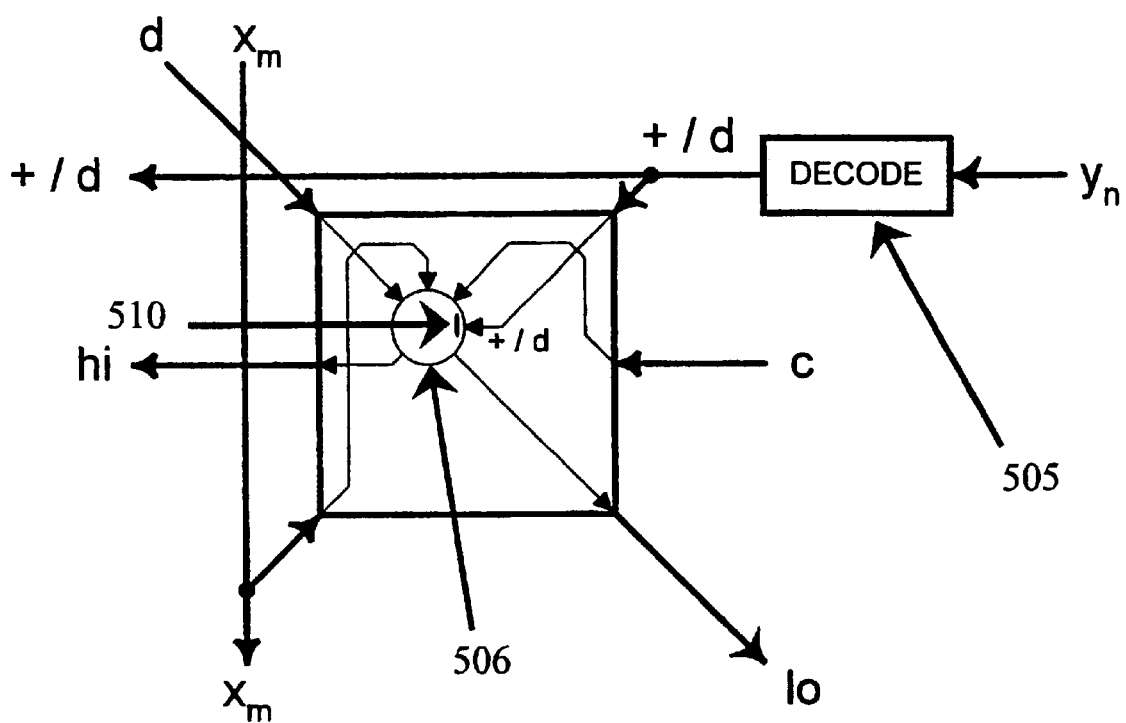
FIG. 7 shows an implementation of a multiplier in a processing element of a processing array according to an embodiment of the first aspect of the invention.

It has been ascertained by the present inventors that for CHESS and comparable architectures, a multiplier can be implemented in a single processing cell. This can be achieved by causing the function of a functional unit to be determined in a data-dependent manner. The approach followed uses a variant upon the "multiplexer" option shown in FIG. 6b. The multiplier cell is shown in FIG. 7, and this cell can be tiled to form a complete multiplier. The functional unit is instructed to generate either the result of the addition, or to pass through the value of the d input, dependent on the value of $y_n$. This requires the instruction input I (labeled 510) to the ALU to be dependent in some matter on $y_n$: this can be done, for example, by using additional logic 505 to decode $y_n$ to instruction inputs required to set the function as indicated for the I input shown on processing element 506. This additional logic 505 will not need to be extensive: for a large array multiplier, any overhead provided by the additional logic will be small compared to the factor of two reduction in the area of the multiplier cells.

Figure 8:
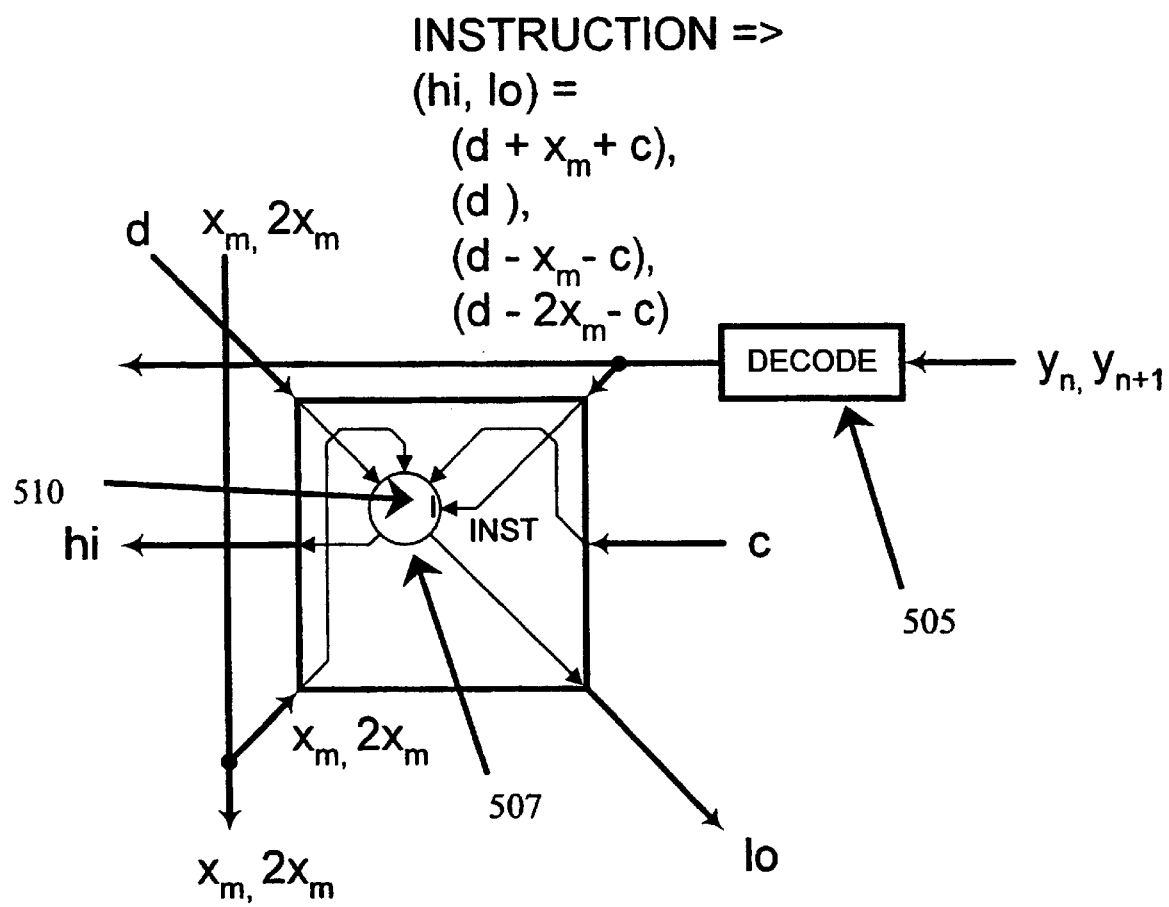
FIG. 8 shows an implementation of a multiplier in a processing element of a processing array according to an embodiment of the second aspect of the invention.

FIG. 8 shows how the ability to change the function of a functional unit in a data-dependent way can be used to further increase multiplier density. In this case, a single processor element (with functional unit 507) is again used, but two bits of the multiplier are used in the operation for a single processing element rather than one alone. Two bits of the multiplier are provided to decoding logic 505, which produces instruction inputs with the four following values: $(d + x_m + c)$; (d); $(d - x_m - c)$ and $(d - 2x_m - c)$. Each of these instructions adds or subtracts a different multiple of the multiplicand, the choice of instruction being selectable according to the value of the two bits $y_n$, $y_{n+1}$.

As will be noted, in the example indicated above, the instructions passed give results of −2, −1, 0 and +1, rather than 0, 1, 2, 3, times the multiplier bits. This can be rectified with a preprocessing step so that the right results appear at the circuit outputs. An exemplary preprocessing procedure to achieve this is summarised below.

1. The multiplicand is converted to a base (−2) representation, in which the bits have significance:

. . . −32+16−8+4−2+1

Considering each pair of bits, the four combinations have the following arithmetic values in base (−2):

| Bit values | Arithmetic value |
   |---|---|
   | 00 | 0 |
   | 01 | +1 |
   | 10 | −2 |
   | 11 | −1 |

These 4 multiples of the multiplicand are the 4 multiples that the array of FIG. 7 of the application adds to the partial sum at each stage.

2. To convert the base 2 multiplicand to base −2, we generate a constant bit pattern M, which has the bit pattern (10) in each pair of bits. Thus the least significant bit of M is 0 and alternate more significant bits are alternately 1 and 0. Then:

base (−2) multiplicand=((base 2 multiplicand)+M)exor M

The operations here are:

| + | arithmetic addition |
   |---|---|
   | exor | bit by bit exclusive OR |

The effect of the exor is to invert alternate bits of the result of the addition, with the least significant bit not being inverted.

3. To understand this process, consider the two possible values of one of the bits of the multiplicand for which M is 1. These are the multiplicand bits that have negative significance in base (−2)

Bit=0. In this case the zero in base (−2) is worth exactly the same as the zero in base 2, so no change is required. Adding the I bit from M will make the sum bit 1, and the exor will then invert this to give a zero result—i.e. the original value as required.

Bit=1 Consider the bit with value 2 in base 2, and (−2) in base (−2)—the other alternate bits all behave in the same way. If this bit is 1, then by interpreting the bit as worth (−2) instead of (+2) we are effectively subtracting 4 from the value of the multiplicand. To offset this we add the 4 back, in 2 stages:

We add M to the multiplicand. The 1 bit in this bit position is worth an additional 2, which forces a carry to the bit worth (+4), and sets the bit worth (−2) to zero.

We exor with M. This does not affect the bit worth (+4), but inverts the bit worth (−2) to 1 again—its original value.

The net effect is that we have added (+4) to the value of the multiplicand, to offset the new interpretation of the (+2) bit as worth (−2). The resultant bit pattern is the representation of the multiplicand in base (−2) as required for the multiplier.

Instructions can thus be provided which achieve the correct result at the respective outputs for each of these options, in the sense that the instructions have the effect of passing to the data outputs values representative of 0, 1, 2, and 3 times the m bits of the multiplicand handled in the processing element according to the value of the two bits of the multiplier. The decoding logic 505 will need in this case to be a little more extensive than for the FIG. 7 case, but as a further factor of two fewer basic processing elements are required to achieve the array multiplier, for a multiplier of any size the further saving will be very significant.

The arrangement described above with respect to FIG. 8 can be further improved by using additional input bits. In particular, if a fifth instruction is used, corresponding to a further different multiple of the multiplicand (specifically, $d+2x_m+c$), then it becomes possible to implement the decoder without dependencies between the separate multiplier stages. Such dependencies lead to an undesirable ripple carry delay effect. This can be achieved by looking at three bits of the multiplicand, rather than two, and implementing a radix-4 modified Booth's algorithm (described at, for example, Koren, I., "Computer Arithmetic Algorithms", 1993, Prentice-Hall Inc., Englewood Cliffs, p99–103). The $y_n$, and $y_{n+1}$ bit pair is supplemented by $y_{n-1}$ as a further input, and instructions are generated as in Table 2 below.

TABLE 2

Radix-4 modified Booth's algorithm instructions for quadruple density multiplier

| $y_{n+1}$ | $y_n$ | $y_{n-1}$ | Instruction |
|---|---|---|---|
| 0 | 0 | 0 | (d) |
| 0 | 0 | 1 | (d + $x_m$ + c) |
| 0 | 1 | 0 | (d + $x_m$ + c) |
| 0 | 1 | 1 | (d + 2$x_m$ + c) |
| 1 | 0 | 0 | (d − 2$x_m$ − c) |
| 1 | 0 | 1 | (d − $x_m$ − c) |
| 1 | 1 | 0 | (d − $x_m$ − c) |
| 1 | 1 | 1 | (d) |

Table 2 can be understood as follows. If the most significant bit of a bit pair (say $y_{n+1}$) is 1, then it contributes −2 to its own bit pair, and +1 to the next most significant bit pair (worth +4 in terms of its own bit pair). Hence if $y_{n-1}$ of the next less significant bit pair is 1, it contributes +1 to the current bit pair. For each row in the table, $(-2*y_{n+1}+Y_n+y_{n-1})$ gives the multiple of the multiplicand to be added at the current bit position, and it can be seen that the instructions correspond to that equation.

A lookup table for each pair of multiplier bits can thus implement the multiplier recoding, with inputs from those bits and the adjacent less significant bit $y_{n-1}$ (or 0 in the case of the least significant bit pair). In the CHESS architecture described with reference to FIGS. 1 to 4, $y_{n-1}$ might be in a different nibble to $y_n$ and $y_{n+1}$, in which case the multiplier will need to be shifted by one bit so that all three bits are accessible to the lookup table. This can be achieved by using an ALU acting as an adder for each digit in the multiplier y to compute the value of (y+y) across the edge of the array from which the multiplier y is provided.

Note that if $y_{n+1}$ is equal to 1, then a "carry" is propagated to the next most significant bit pair. If the current bit pair were the most significant bit pair, then the carry would be lost, leading to an incorrect result. To prevent this, an unsigned multiplier must be extended to ensure that it has at least one most significant zero bit—as is discussed below, this approach will not be followed for a signed multiplier.

The carry bit into each ALU is added or subtracted according to whether the instruction is an addition or a subtraction. That implies that each carry must be generated and consumed in two ALUs that are either both performing additions or both performing subtractions. As the choice of addition/subtraction is determined by the instruction, this implies that the carries need to be fed across the array in the same direction as the instructions. If the significance of the carries were not instruction-dependent, the carries could be fed across the array either horizontally or vertically, and the choice could be made to simplify pipelining of the array. This scheme requires that the multiplicand is pre-multiplied by 2 to be fed across the array. This requires an adder/shifter per digit position across one edge of the array. It also requires the array to be extended in multiplicand width to accommodate the width of the pre-multiplied multiplicand.

For implementation with the architecture described in FIGS. 1 to 4, in which wiring is all aligned to 4-bit widths, this scheme requires that the multiplicand is pre-multiplied by 2, 4 and 8 to be fed across the array. This requires 3 adders/shifters per digit position across one edge of the array. It also requires the array to be extended by a 4-bit digit in multiplicand width to accommodate the width of the pre-multiplied multiplicands. If the multiplicand is signed, then it will need to be sign-extended to fill the additional width (sign extension is discussed further below).

Multipliers as described above can be adapted for use with signed numbers. The overall structure of the multiplier array is affected differently by signed multipliers and signed multiplicands, as is indicated below. For the purposes of the following discussion, it is presumed that the number at issue is in two's complement representation: in the normal form of this representation, positive numbers Y have an unchanged value (of Y) whereas negative numbers −Y are given the value R−Y, where R is 2X+1 (where X is a maximum allowed value of Y).

The most significant bit of a number is therefore "worth" $-2^n$, rather than $2^n$ as in an unsigned number. This means that in a multiplier array that handles signed multipliers, the partial product that is generated by the most significant bit of the multiplier has negative arithmetic significance, and so has to be subtracted from the overall result, rather than be added as in the unsigned case. However, the five instruction Booth re-coding scheme indicated above already has the desired properties, and consequently handles a signed multiplier automatically. In contrast to the unsigned case, the multiplier is not to be extended with a most significant bit equal to zero—instead, the most significant bit is a sign bit.

Figure 9A:
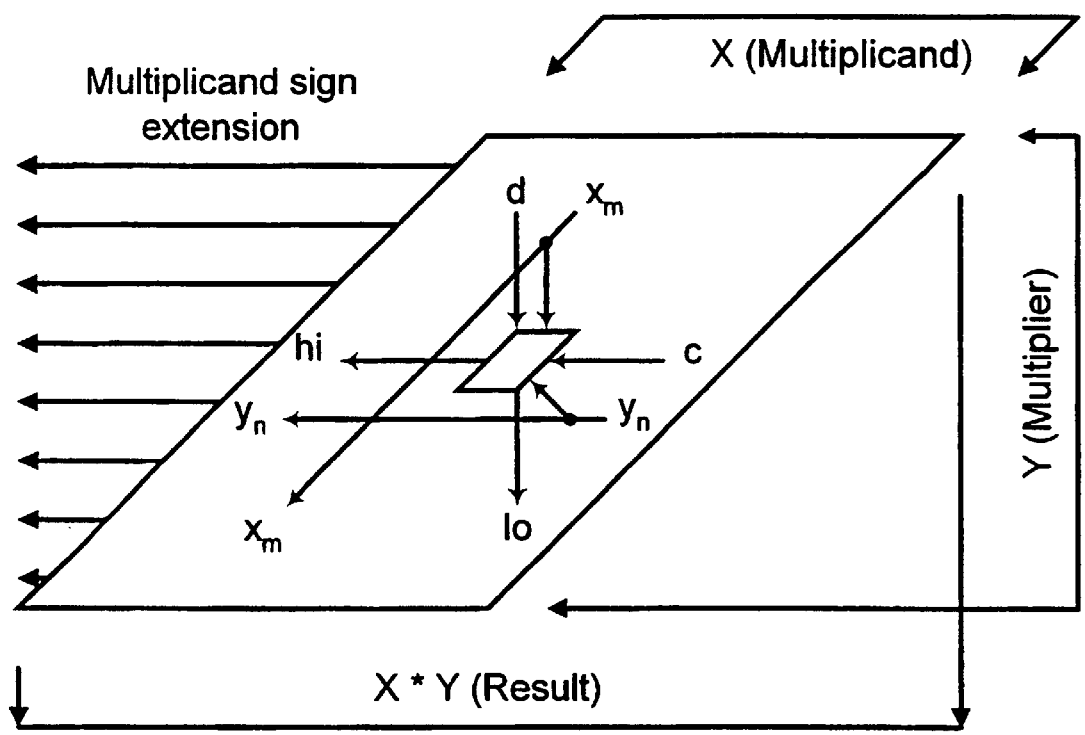
FIG. 9a shows a multiplier as shown in FIG. 7 or 8 with a diagrammatic illustration of the additional bits needed to sign extend each of the partial products to the full length of the result.

For a signed multiplicand, additional circuitry is needed as is shown in FIG. 9a. FIG. 9a shows a full multiplication, laid out in a structure mirroring a longhand calculation, with one characteristic cell and its inputs and outputs set out. If the multiplicand is signed, then partial products are also signed, and as is shown at the left-hand side of the structure, need to be sign-extended to the full width of the complete product for a correct result. A direct implementation of sign extension would represent an overhead of approximately 50% for multiplier cells of the type shown in FIG. 8. However, there is scope for greater efficiency in summation of these sign extensions, as they are repeated 1's or 0's in each partial product. To extend the sign, we use a basic property of two's complement arithmetic, that $$(-s)sssssz_4z_3z_2z_1z_0 00000 (-s)z_4z_3z_2z_1z_0$$

This allows us to extend the sign to the extent necessary.

Working from the least significant to the most significant partial sum, the sum of the sign extensions encountered so far is the result of the most significant sum bit down the left hand side of the trapezoidal array shown in FIG. 9a. Consequently, by extracting the most significant sum bit in each partial sum down that left hand side, extending this bit to a full digit, and adding the result back into the next partial sum, we can get the effect of summing the sign extensions, without incurring such a large overhead.

Figure 9B:
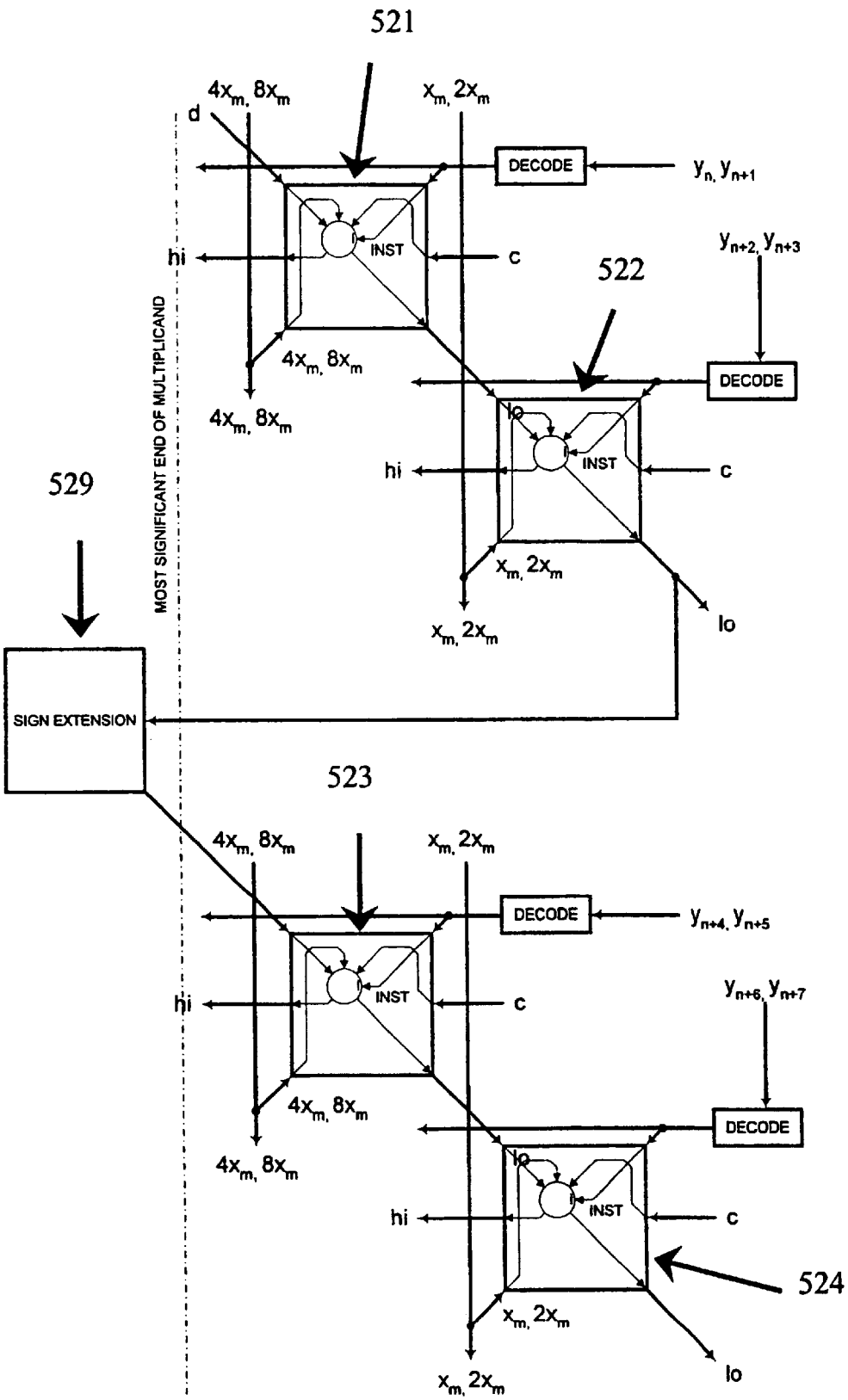
FIG. 9b shows four multipliers as shown in FIG. 7 or 8 in an arrangement adapted for sign extension.

FIG. 9b shows how this can be implemented effectively in the arrangement shown in FIG. 9a, using multiplier cells as shown in FIG. 8, for example. In FIG. 9b, a part of the left hand edge of the array is shown for a series of multiplier bit pairs 521, 522; 523, 524. The sign extension is taken from the lo output of one of these multiplier bit pairs and passed to the sign extension unit, which can be implemented as a lookup table. If the most significant bit of the lo output is 0, then the sign extension unit generates a digit of binary value 0000. If the most significant bit of the lo output is 1, then the sign extension unit generates a digit of binary value 1111. With this arrangement, the sign extension is provided in a manner equivalent to fully extending the sign as suggested by FIG. 9a, but without the considerable additional cost.

Alternatively, the multiplier array could be increased in width as much as necessary so that each partial sum is guaranteed to have its most significant digit consist entirely of sign bits. In that case separate sign extension circuitry would not be necessary, as the lo output of one of the multiplier bit pairs would always consist of either all zeroes or all ones, and this lo digit could simply be copied to produce a new sign extension digit to be input to the next row of the array. However, the cost of this approach would be significant.

Figure 10A:
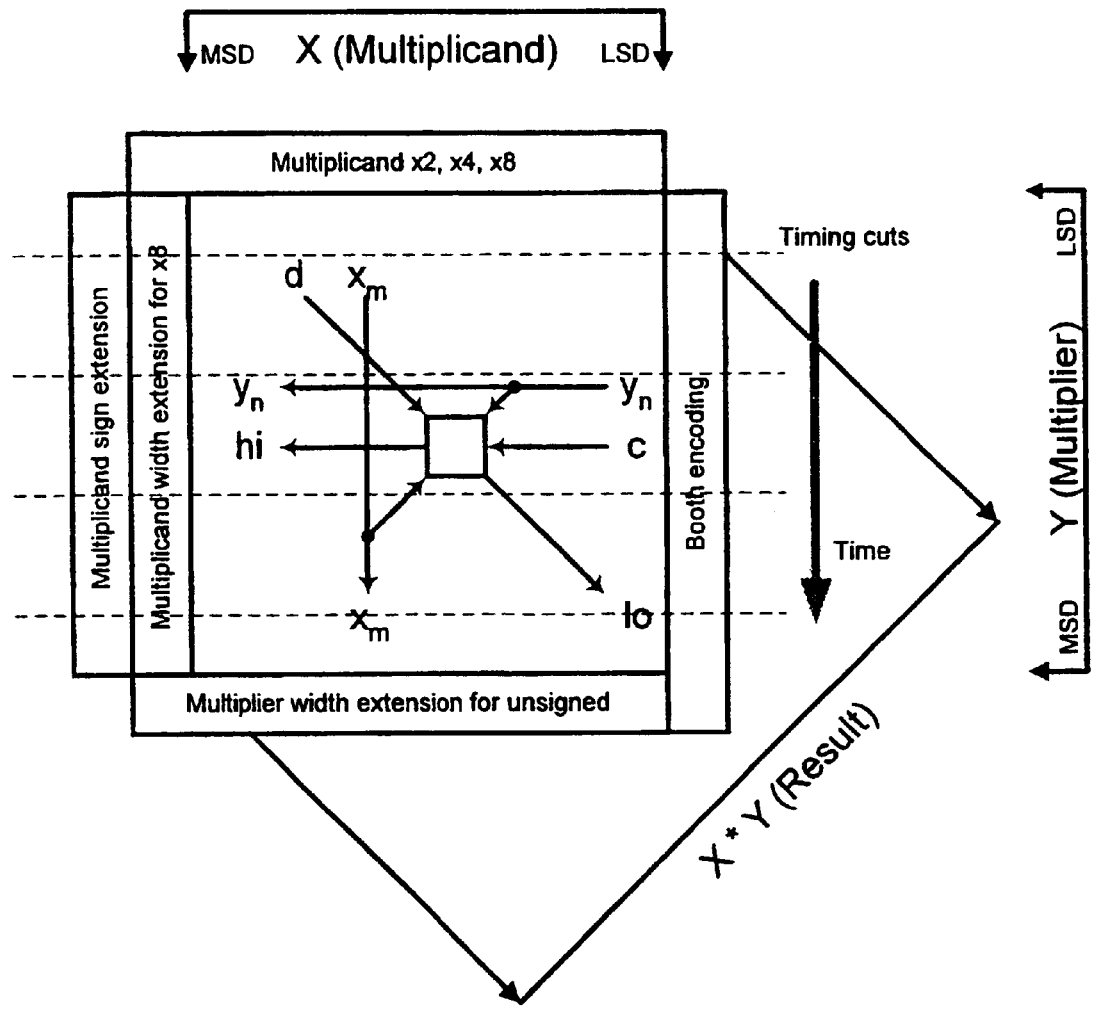
FIGS. 10a and 10b show array multipliers using multiplier cells as shown in FIG. 7 or 8 adapted for use with a signed and an unsigned multiplicand respectively.

The above treatments describe an array multiplier which is purely combinatorial, without any pipelining registers. Pipelining, particularly for a large array multiplier, will be important to achieve high speed—it is therefore helpful to pipeline the multiplier carefully. The following factors are important for determining the best choice of pipeline:

1. A pipelining cut across the multiplicand involves pipelining not only the multiplicand itself, but also for this architecture the ×2, ×4 and ×8 derivatives of it. This is expensive, and so should only be done when cheaper alternatives have been exhausted.
2. With a signed multiplicand, the sign extension mechanism creates dependencies running from the least significant to the most significant end of the multiplier, forcing the partial products to be accumulated in that order. With an unsigned multiplicand this is not the case, and the partial products can be accumulated in any order.
3. Because the arithmetic significance of a carry is affected by whether the operation being performed is an addition or a subtraction, carries must be propagated to the left as shown in FIG. 9a for the quadruple density multiplier of FIG. 8.
4. For a signed multiplicand carries propagate to the left, and the partial products must be accumulated from top to bottom because of the dependencies in the sign extension mechanism. This forces partial sums to propagate to the right. This means that it is not possible to make vertical timing cuts across the array, as carries would cross the timing cuts in one direction and the partial sums would cross the timing cuts in the opposite direction. As a result we are forced to make either horizontal or diagonal (top left to bottom right) timing cuts in this case. The diagonal timing cuts do not cut the d to lo path, which would accumulate a large combinatorial delay across the array. The best approach is thus to make horizontal timing cuts when there is a signed multiplicand, and to take the overhead of pipelining the multiplicand and its 3 derivatives. FIG. 10a shows the data flow across the complete multiplier array for a signed multiplicand, and summarises the various array overheads in this case.

Figure 10B:
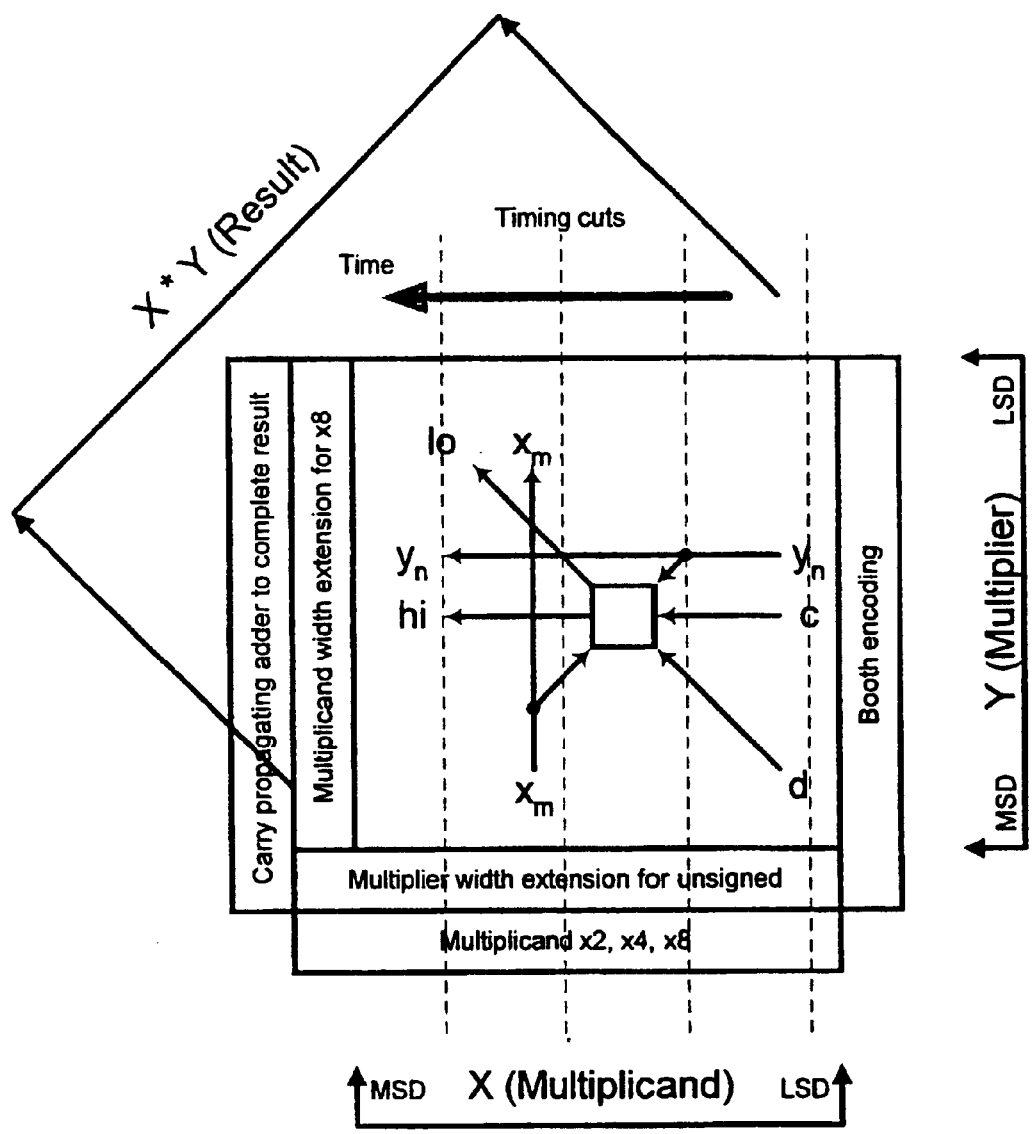

These timing cuts imply that the multiplicand should be presented to the multiplier in parallel, and the multiplier in a skewed format with less significant digits coming before more significant ones. The exact timing is related to the positions chosen for the timing cuts. The less significant half of the result is generated in skewed format, and the more significant half is available in parallel. Additional retiming could be applied to the most significant half of the result to skew this in the same way as the least significant half of the result. If this were done, then the additional retiming would be an additional overhead on the bottom edge of the array as drawn.
5. For an unsigned multiplicand there is no sign extension mechanism, and so we are free to accumulate the partial products from the most significant end of the multiplier to the least significant end—the opposite direction from that shown in FIG. 10a. In that case the lo and hi outputs both cross vertical timing cuts in the same direction (to the left), and so vertical timing cuts are allowable, and preferred because they are cheaper. FIG. 10b illustrates the multiplier array for this case.

Timing cuts of this form imply that the multiplier should be presented to the array in parallel, and that the multiplicand should be presented to the array in skewed format with the less significant digits coming first. This is opposite to the data timing required for the signed multiplier with horizontal timing cuts.

The exact timing is related to the positions chosen for the timing cuts.

As for the signed multiplier, the less significant half of the result is generated in skewed format, and the more significant half is available in parallel. Additional retiming could be applied to the most significant half of the result to skew this in the same way as the least significant half of the result. If this was done, then the additional retiming would be an additional overhead on the top edge of the array as drawn in this case.

The quadruple density approach of FIG. 8 gives an excellent array, but requires pipelining for arrays of useful sizes. Such pipelining forces some of the inputs and outputs to be presented in skewed format, which could be expensive to arrange in some applications. The skewed timing is forced because the partial products are accumulated in a linear chain, which in turn is due to the basic cell being able to form a partial product and accumulate just one other input (and a carry input). If an approach is taken in which the formation of the partial products is separated from their accumulation, then the formation of each partial product is an independent operation, and they can all be carried out in parallel. This leads to solutions in which some cells are under-utilised and are used just to form the partial products (with one input being unused), and other cells are used to accumulate pairs of partial products or partial sums. In this approach, the cells used to form the partial products can still use Booth encoding of the multiplier to drive the instruction inputs, allowing them to accumulate the partial product corresponding to two bits of the multiplier in each cell. The cells that accumulate pairs of partial products are statically configured as adders, and do not use the instruction inputs.

The advantages of this approach over the linear accumulation approach are that the inputs and outputs are available in parallel, and that the adder tree has a lower latency than the linear chains of adders. The disadvantages are that it requires more cells than the linear accumulation approach, the cell connections are such that some long connections over the array that could limit the operating speed may be required, and that such an approach is incompatible with the efficient sign extension of the multiplicand described above, because this efficient form of sign extension requires the partial products to be processed least significant first, giving an additional dependency that forces the linear accumulation of the partial products.

Alternatives to the pipelined array multipliers of FIGS. 10a and 10b can be provided in analogous serial by parallel multipliers. In these, the successive "time-slices" of the complete calculation are mapped onto the same linear strip of hardware in successive clock cycles, instead of being distributed in space as is the case in the array multipliers. The available options are the same as in the array multiplier cases, but in the array multiplier the cost of pipelining the multiplicand strongly influenced the choice of pipelining, whereas that is not a significant issue in the serial by parallel multiplier case. On the other hand, any array overheads that have to be provided along the length of the linear multiplier will be proportionately more expensive than in the array multiplier case.

Figure 11A:
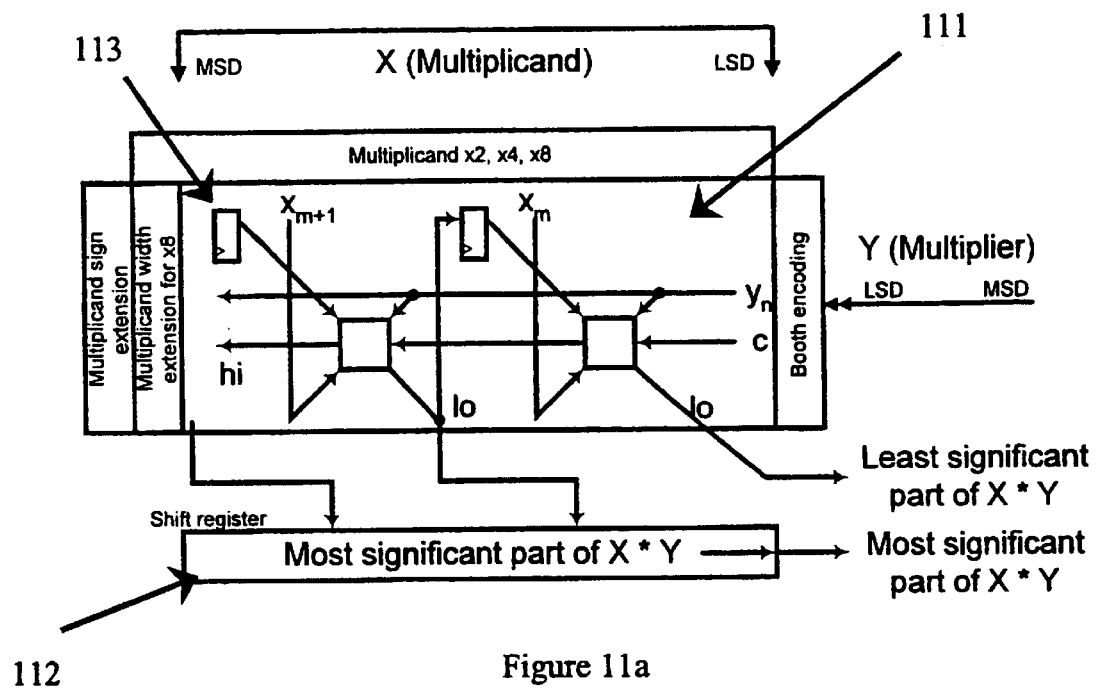
FIGS. 11a and 11b show linear multipliers using multiplier cells as shown in FIG. 7 or 8 for, respectively, serial multiplier and parallel multiplicand, and parallel multiplier and serial multiplicand.

FIG. 11a shows a serial multiplier with parallel multiplicand. This is effectively equivalent to projection of the array multiplier of FIG. 10a on to a linear array, with the linear array performing the work of successive horizontal strips of the array in successive time steps. The multiplier is fed in incrementally in serial form, with the multiplicand available in parallel to the processing array 111. On the first step, the first (least significant bit) of the multiplier is multiplied with the full multiplicand. The result is read out into registers 113, except for the least significant bit, which is fed out separately. Each time step produces in this manner one more digit of the least significant part of the result, and at the final time step the rest of the result (the most significant part) is available in parallel from registers 113. To allow the multiplier to be reused immediately for another calculation, the result for the most significant part which is transferred in parallel to shift register 112 is accessed in digital serial format on a separate bus.

Benefits of this form of parallel-serial multiplier are that the Booth encoding overhead is incurred for just one digit of the multiplier, the multiplicand and its three multiples do not need to be pipelined (they are held at a constant value for the duration of each multiplication), and that only one shift register is needed to hold the most significant half of the result, as the carries have already been propagated and the result is in normal binary representation (unsigned or two's complement). Drawbacks of this parallel-serial multiplier are that the three multiples of the multiplicand are expensive to compute and that the lack of pipelining in the carry path could limit the speed for large multiplicands.

Figure 11B:
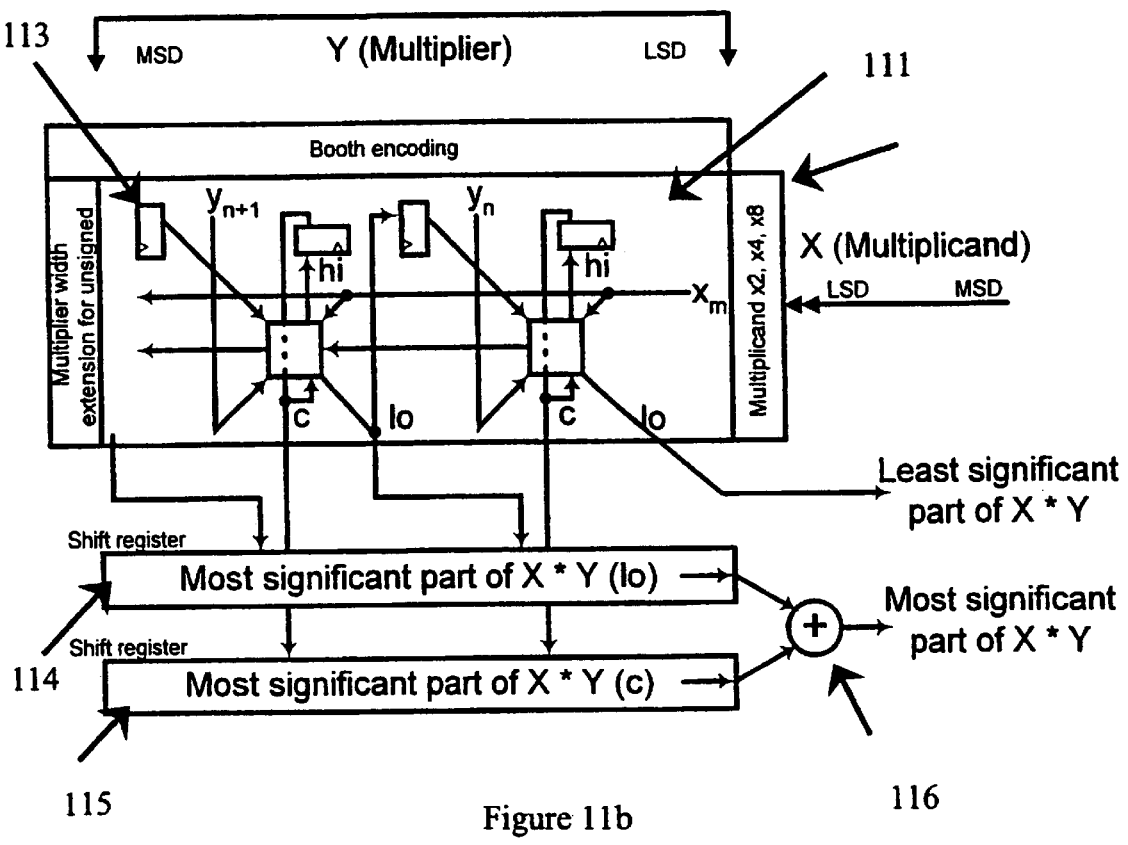

FIG. 11b shows, similarly, a parallel multiplier with serial multiplicand: this time as a result of projecting the array multiplier of FIG. 10b on to a linear array. For this case, there are now two shift registers 114 and 115 for the lo and the c components. Each time step again produces one digit of the least significant part of the result, with the most significant part of the result becoming available in parallel at the final time step although the lo and c components of the more significant part of the result still need to be added together to obtain a two's complement representation. For immediate reuse of the multiplier, it is necessary here for both these parts of the result to be transferred in parallel to the two shift registers 114 and 115 for access in digit serial format, summation, and driving to a separate bus. A particularly efficient way to do this is by reading out shift registers 114 and 115 digit by digit and adding the digits as they appear through adder 116 (this allows the carry to be handled efficiently).

Benefits of this form of multiplier are pipelining of all paths to avoid any propagation delay problem, and the existence of only one digit of overhead for generating ×2, ×4 and ×8 versions of the multiplicand. Drawbacks are incurring the overhead of Booth encoding for the full width of the multiplier, and a double overhead of shift registers to hold the most significant parts of the result (as carries are not fully propagated before the transfer to registers takes place).

Choice of serial-parallel multiplier is determined by the requirements of the particular function and the specific architecture: as a general (not universal) principle, the parallel multiplicand serial multiplier will use less hardware, whereas the serial multiplicand parallel multiplier will have fewer speed restrictions.

It is also possible to use a serial by serial multiplier. Design of a serial by serial multiplier with low latency from serial by parallel and parallel by serial multipliers is itself known, and is described at, for example, Hartley, R I and Parhi, KK, "Digit-Serial Computation", Kluwer Academic, Norwell, USA, 1995 at pages 56 to 61. With this technique, generation of a result can start within a clock delay of the inputs starting to become available. This technique is an effective one if used with the novel serial by parallel and parallel by serial multipliers provided by embodiments of the present invention.

Figure 12A:
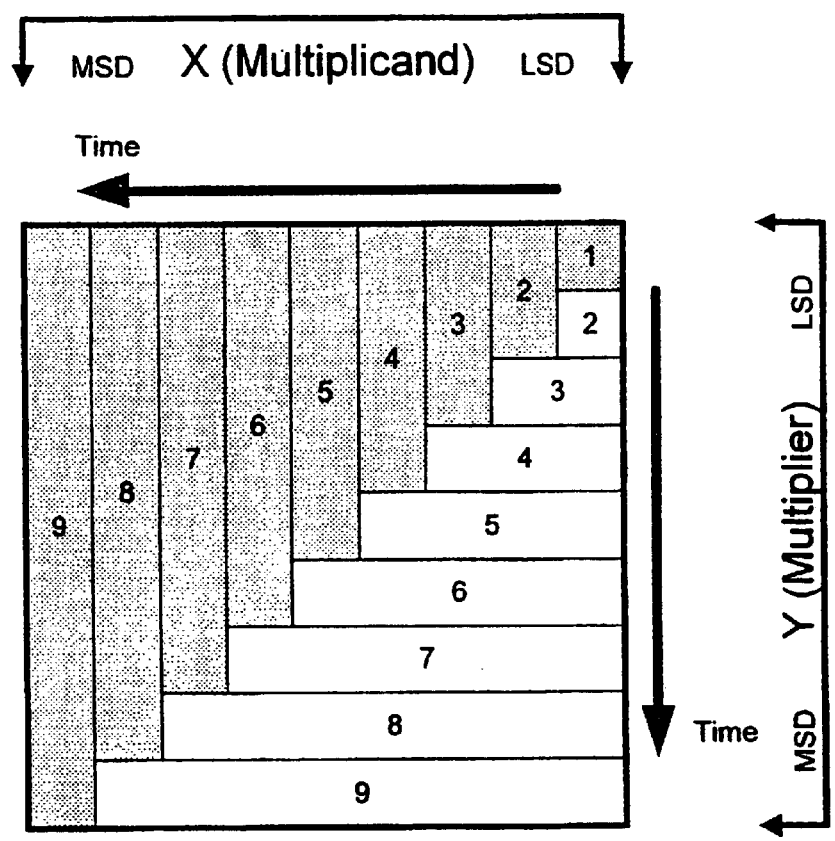
FIGS. 12a and 12b show, respectively, the sequence of operations and the schematic structure for a serial by serial multiplier using the linear multipliers of FIGS. 11a and FIG. 11b.

Both inputs to the serial by serial multiplier are provided serially, least significant digit first. Clearly, after the least significant D digits of each operand have been supplied, the multiplier has sufficient information to generate the least significant D digits of the result. Referring to FIG. 12a, at time step D the product of the least significant D digits of the two operands can be formed. This will have 2D digits in general, of which the least significant D digits will not change again and can be output from the circuit. The most significant digits are retained, as at the next time step additional terms will be added to them to form the next partial product.

The additional terms added at each time step are indicated by a pair of rectangles labelled with the number of the time step in FIG. 12a. For example at time step 5, the vertical rectangle (shaded) numbered 5 indicates the product of digit 5 of X and digits 1–5 inclusive of Y. The horizontal rectangle numbered 5 indicates the product of digit 5 of Y and digits 1–4 inclusive of X. Both of these products need to be added to the partial product generated at time step 4 to produce the partial product at time step 5.

Figure 12B:
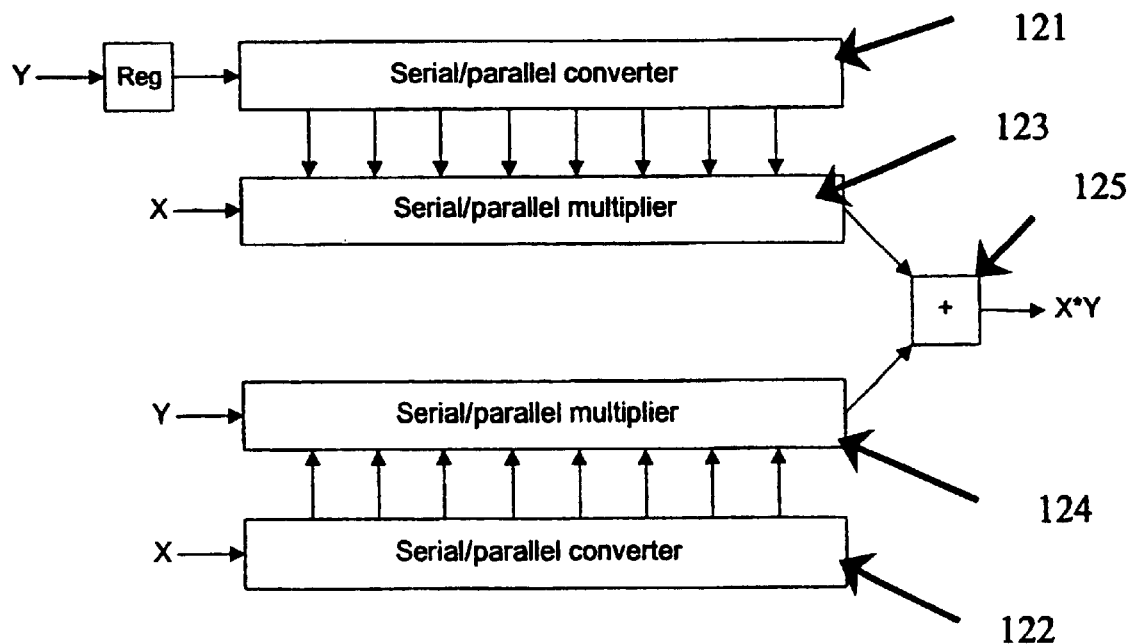

Both horizontal and vertical shaded rectangles in FIG. 12a correspond to serial by parallel multiplications as described with reference to FIGS. 11a and 11b. The FIG. 12a case does however differ, in that the parallel components are not constant throughout the calculation but are changed at each time step. The calculation can therefore be carried out, as shown in FIG. 12b, by two shift registers 121, 122, each feeding a respective serial-parallel multiplier 123, 124, with the output of the two multipliers 123, 124 being summed by a serial adder 125. Each of the serial-parallel multipliers 123, 124 can be built in either of the styles shown in FIGS. 11a and 11b.

As the skilled man will appreciate, many variations and modifications are possible in application of the invention. In particular, the invention is not restricted only to CHESS type arrays, but is usable for essentially any type of array processing in which data dependent instructions can be provided to each processing element.

What is claimed is:

1. A method of multiplying a first number by a second number by use of an array of processing devices, each of said processing devices having a plurality of data inputs, a plurality of data outputs, and an instruction input for control of the function of the processing device, wherein an input for the first number and an input for the second number are connected to said processing devices, and said processing devices are connected to each other by a freely configurable interconnect, and wherein each processing device calculates a partial product for multiplication of one or more bits of the first number with one or more bits of the second number, and for each processing device:

the value received at the instruction input is determined by two bits of the first number;

data inputs are provided by m bits of the second number, a summation input for a sum of partial products of the same significance, and, if appropriate, a carry input to add a carry from a less significant partial product;

data outputs are provided as a summation output containing the least significant m bits of the partial product and a carry output containing any more significant bits of the partial product; and a plurality of instructions provided each cause to be passed to the data outputs values representative of 0, 1, 2, and 3 times the m bits of the second number, in accordance with the values of the two bits of the first number.

2. The method of multiplying as claimed in claim 1, wherein at least one of the first number and the second number is signed.

3. The method of multiplying as claimed in claim 2 in which the second number is signed, in which the sign is derived by progressive addition of the most significant sum bits into each partial sum involving the most significant bit of the second number.

4. The method of multiplying as claimed in claim 1, further comprising providing either the first number or the second number in a pipeline, in which one of the first number and the second number is provided to the array of processing devices in parallel, and in which the other of the first number and the second number is provided to the array of processing devices incrementally from least significant to most significant bit.

5. The method of multiplying as claimed in claim 4, wherein the array of processing devices further comprises a plurality of auxiliary processing devices adapted to sum partial products, whereby the formation of partial products by a processing device can be carried out without dependency on the output of another processing device.

6. The method of multiplying as claimed in claim 1, wherein the array of processing devices is a linear array, and wherein multiplication of the first number by the second number is divided into a plurality of time separated steps, wherein each time separated step comprises multiplying one or more bits of one of the first number and the second number by all the bits of the other one of the first number and the second number along the linear array and accumulating results of each time separated step into one or more registers, wherein the result of the multiplication is derived from the one or more registers after the plurality of time separated steps have been completed.

7. The method of multiplying as claimed in claim 1, wherein the array of processing devices is provided as two linear arrays, in each of which multiplication of the first number by the second number is divided into a plurality of time separated steps, wherein each time separated step comprises multiplying one or more bits of one of the first number and the second number by one or more bits of the other one of the first number and the second number along each linear array and for each array accumulating results of each time separated step into one or more registers, whereupon the outputs of the registers for each linear array are combined to provide the result of the multiplication incrementally.

8. A method of multiplying a first number by a second number by use of an array of processing devices, each of said processing devices having a plurality of data inputs, a plurality of data outputs, and an instruction input for control of the function of the processing device, wherein an input for the first number and an input for the second number are connected to said processing devices, and said processing devices are connected to each other by a freely configurable interconnect, and wherein each processing device calculates a partial product for multiplication of one or more bits of the first number with one or more bits of the second number, and for each processing device:

the value received at the instruction input is determined by three bits of the first number;

data inputs are provided by m bits of the second number, a summation input for a sum of partial products of the same significance, and, if appropriate, a carry input to add a carry from a less significant partial product;

data outputs are provided as a summation output containing the least significant m bits of the partial product and a carry output containing any more significant bits of the partial product; and a plurality of instructions provided each cause to be passed to the data outputs values representative of 0, 1, 2, 3 and 4 times the m bits of the second number, in accordance with the values of the three bits of the first number.

9. The method of multiplying as claimed in claim 8, wherein the relationship between the three bits of the first number and the values passed to the data outputs is in accordance with a radix-4 modified Booth's algorithm.

10. The method of multiplying as claimed in claim 8, wherein at least one of the first number and the second number is signed.

11. The method of multiplying as claimed in claim 10 in which the second number is signed, in which the sign is derived by progressive addition of the most significant sum bits into each partial sum involving the most significant bit of the second number.

12. The method of multiplying as claimed in claim 8, further comprising providing either the first number or the second number in a pipeline, in which one of the first number and the second number is provided to the array of processing devices in parallel, and in which the other of the first number and the second number is provided to the array of processing devices incrementally from least significant to most significant bit.

13. The method of multiplying as claimed in claim 12, wherein the array of processing devices further comprises a plurality of auxiliary processing devices adapted to sum partial products, whereby the formation of partial products by a processing device can be carried out without dependency on the output of another processing device.

14. The method of multiplying as claimed in claim 8, wherein the array of processing devices is a linear array, and wherein multiplication of the first number by the second number is divided into a plurality of time separated steps, wherein each time separated step comprises multiplying one or more bits of one of the first number and the second number by all the bits of the other one of the first number and the second number along the linear array and accumulating results of each time separated step into one or more registers, wherein the result of the multiplication is derived from the one or more registers after the plurality of time separated steps have been completed.

15. The method of multiplying as claimed in claim 8, wherein the array of processing devices is provided as two linear arrays, in each of which multiplication of the first number by the second number is divided into a plurality of time separated steps, wherein each time separated step comprises multiplying one or more bits of one of the first number and the second number by one or more bits of the other one of the first number and the second number along each linear array and for each array accumulating results of each time separated step into one or more registers, whereupon the outputs of the registers for each linear array are combined to provide the result of the multiplication incrementally.

16. An apparatus for multiplying, comprising:
an array of processing devices, wherein each processing device has a plurality of data inputs, a plurality of data outputs, and an instruction input for control of the function of the processing device;
an input to receive a first number and an input to receive a second number, and an output to provide the result of the multiplication; and
a freely configurable interconnect to connect together the inputs, the output, the data inputs, the data outputs and the instruction input,
wherein each processing device calculates a partial product for multiplication of one or more bits of the first number with one or more bits of the second number, and the interconnect is adapted such that for each processing device:
the value received at the instruction input is determined by two bits of the first number;
data inputs are provided by m bits of the second number, a summation input for a sum of partial products of the same significance, and, if appropriate, a carry input to add a carry from a less significant partial product;
data outputs are provided as a summation output containing the least significant m bits of the partial product and a carry output containing any more significant bits of the partial product; and
a plurality of instructions provided each cause to be passed to the data outputs values representative of 0, 1, 2, and 3 times the m bits of the second number, in accordance with the values of the two bits of the first number.

17. The apparatus for multiplying as claimed in claim 16 in which the second number is signed, in which the sign is derived by progressive addition of the most significant sum bits into each partial sum involving the most significant bit of the second number.

18. The apparatus for multiplying as claimed in claim 16, further comprising providing either the first number or the second number in a pipeline, in which one of the first number and the second number is provided to the array of processing devices in parallel, and in which the other of the first number and the second number is provided to the array of processing devices incrementally from least significant to most significant bit.

19. The apparatus for multiplying as claimed in claim 18, wherein the array of processing devices further comprises a plurality of auxiliary processing devices adapted to sum partial products, whereby the formation of partial products by a processing device can be carried out without dependency on the output of another processing device.

20. The apparatus for multiplying as claimed in claim 16, wherein the array of processing devices is a linear array, and wherein the apparatus further comprises one or more registers, wherein multiplication of the first number by the second number is divided into a plurality of time separated steps, wherein each time separated step comprises multiplying one or more bits of one of the first number and the second number by all the bits of the other one of the first number and the second number along the linear array and accumulating results of each time separated step into one or more of the registers, wherein the result of the multiplication is derived from the registers after the plurality of time separated steps have been completed.

21. The apparatus for multiplying as claimed in claim 16, wherein the array of processing devices is provided as two linear arrays, in each of which multiplication of the first number by the second number is divided into a plurality of time separated steps, wherein each time separated step comprises multiplying one or more bits of one of the first number and the second number by one or more bits of the other one of the first number and the second number along each linear array and for each array accumulating results of each time separated step into one or more registers, whereupon the outputs of the registers for each linear array are combined to provide the result of the multiplication incrementally.

22. An apparatus for multiplying, comprising:
an array of processing devices, wherein each processing device has a plurality of data inputs, a plurality of data outputs, and an instruction input for control of the function of the processing device;
an input to receive a first number and an input to receive a second number, and an output to provide the result of the multiplication; and
a freely configurable interconnect to connect together the inputs, the output, the data inputs, the data outputs and the instruction input,
wherein each processing device calculates a partial product for multiplication of one or more bits of the first number with one or more bits of the second number, and the interconnect is adapted such that for each processing device:
the value received at the instruction input is determined by three bits of the first number;
data inputs are provided by m bits of the second number, a summation input for a sum of partial products of the same significance, and, if appropriate, a carry input to add a carry from a less significant partial product;
data outputs are provided as a summation output containing the least significant m bits of the partial product and a carry output containing any more significant bits of the partial product; and
a plurality of instructions provided each cause to be passed to the data outputs values representative of 0, 1, 2, 3 and 4 times the m bits of the second number, in accordance with the values of the three bits of the first number.

23. The apparatus for multiplying as claimed in claim 22, wherein the relationship between the three bits of the first number and the values passed to the data outputs is in accordance with a radix-4 modified Booth's algorithm.

24. The apparatus for multiplying as claimed in claim 22 in which the second number is signed, in which the sign is derived by progressive addition of the most significant sum bits into each partial sum involving the most significant bit of the second number.

25. The apparatus for multiplying as claimed in claim 22, further comprising providing either the first number or the second number in a pipeline, in which one of the first number and the second number is provided to the array of processing devices in parallel, and in which the other of the first number and the second number is provided to the array of processing devices incrementally from least significant to most significant bit.

26. The apparatus for multiplying as claimed in claim 25, wherein the array of processing devices further comprises a plurality of auxiliary processing devices adapted to sum partial products, whereby the formation of partial products by a processing device can be carried out without dependency on the output of another processing device.

27. The apparatus for multiplying as claimed in claim 22, wherein the array of processing devices is a linear array, and wherein the apparatus further comprises one or more registers, wherein multiplication of the first number by the second number is divided into a plurality of time separated steps, wherein each time separated step comprises multiplying one or more bits of one of the first number and the second number by all the bits of the other one of the first number and the second number along the linear array and accumulating results of each time separated step into one or more of the registers, wherein the result of the multiplication is derived from the registers after the plurality of time separated steps have been completed.

28. The apparatus for multiplying as claimed in claim 22, wherein the array of processing devices is provided as two linear arrays, in each of which multiplication of the first number by the second number is divided into a plurality of time separated steps, wherein each time separated step comprises multiplying one or more bits of one of the first number and the second number by one or more bits of the other one of the first number and the second number along each linear array and for each array accumulating results of each time separated step into one or more registers, whereupon the outputs of the registers for each linear array are combined to provide the result of the multiplication incrementally.

* * * * *

UNITED STATES PATENT AND TRADEMARK OFFICE
CERTIFICATE OF CORRECTION

PATENT NO. : 6,567,834 B1  Page 1 of 1
DATED : May 20, 2003
INVENTOR(S) : Alan David Marshall et al.

It is certified that error appears in the above-identified patent and that said Letters Patent is hereby corrected as shown below:

<u>Drawings,</u>
Figure 2, Sheet 2 of 15, please delete the following words:
"(Figure 6A)", "(Figure 6B)", "(Figure 6C)", "(Figures 3 to 5)", and "(Figure 9)".

Signed and Sealed this

Twenty-fifth Day of May, 2004

JON W. DUDAS
*Acting Director of the United States Patent and Trademark Office*